(12) United States Patent
Zeiger

(10) Patent No.: US 6,699,082 B2
(45) Date of Patent: Mar. 2, 2004

(54) TIE BAR AND MOUNT FOR BOAT DRIVES

(76) Inventor: Donald J. Zeiger, 129 Bayshore Dr., Sandusky, OH (US) 44870

( * ) Notice: Subject to any disclaimer, the term of this patent is extended or adjusted under 35 U.S.C. 154(b) by 0 days.

(21) Appl. No.: 10/189,672

(22) Filed: Jul. 3, 2002

(65) Prior Publication Data

US 2004/0005824 A1 Jan. 8, 2004

(51) Int. Cl.$^7$ ................................................ B63H 5/25
(52) U.S. Cl. ........................ 440/63; 74/579 R; 74/586
(58) Field of Search .......................... 440/53, 63, 61 R, 440/615; 74/579 R, 586

(56) References Cited

U.S. PATENT DOCUMENTS

| | | |
|---|---|---|
| 2,999,476 A | 9/1961 | Johnson |
| 3,756,186 A | 9/1973 | Nordling |
| 4,009,678 A | 3/1977 | North |
| 4,300,888 A | 11/1981 | Warning |
| 4,311,471 A | 1/1982 | Queen |
| 4,573,930 A | 3/1986 | Queen |
| 4,778,418 A | 10/1988 | Mondek |
| 4,808,131 A | 2/1989 | Glen |
| 5,049,097 A | 9/1991 | Rodskier et al. |
| 5,370,075 A | 12/1994 | Rodskier |
| 5,505,106 A * | 4/1996 | Herman ........................ 74/586 |
| 6,224,438 B1 | 5/2001 | Hase |
| 6,322,408 B1 * | 11/2001 | Latham ........................ 440/63 |

* cited by examiner

*Primary Examiner*—Sherman Basinger
(74) *Attorney, Agent, or Firm*—Sand & Sebolt

(57) ABSTRACT

A motor boat drive mounting configuration connects the drives of a boat together at their centerlines so that the drives are turned at equal angles and are synchronized by the boat's steering system. The tie bar that interconnects the drives includes an end assembly that is configured to rotate 360 degrees with respect to an outer tube. The end assembly using a lug rotatably disposed in a threaded insert to provide the rotation. An end assembly disposed at the other end of the outer tube provides selective length adjustment through a threaded connection between the end assembly and the outer tube. A lock nut locks the position of the end assembly. In one embodiment, the tie bar is connected to a reconfigurable motor mount that may be selectively reconfigured in left hand, right hand, and center configurations.

29 Claims, 22 Drawing Sheets

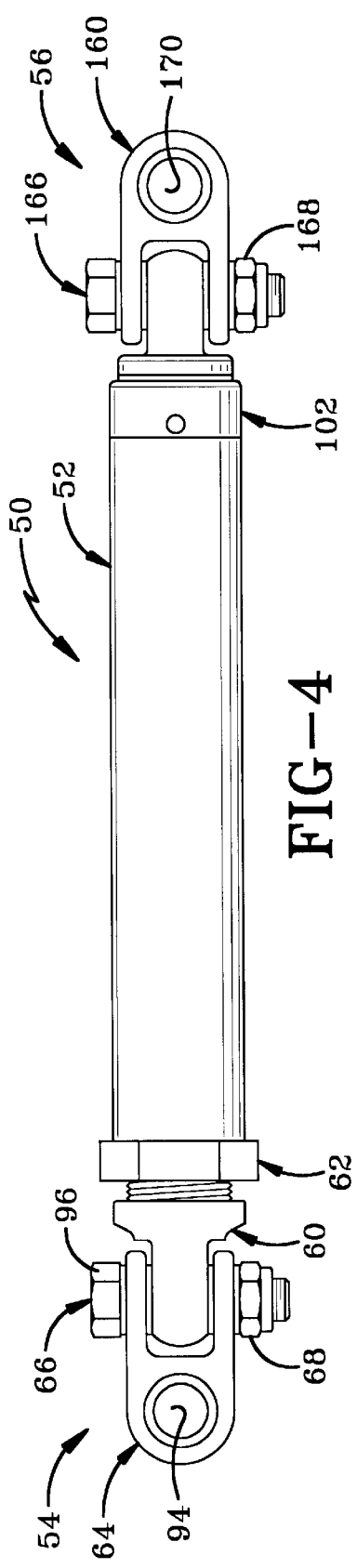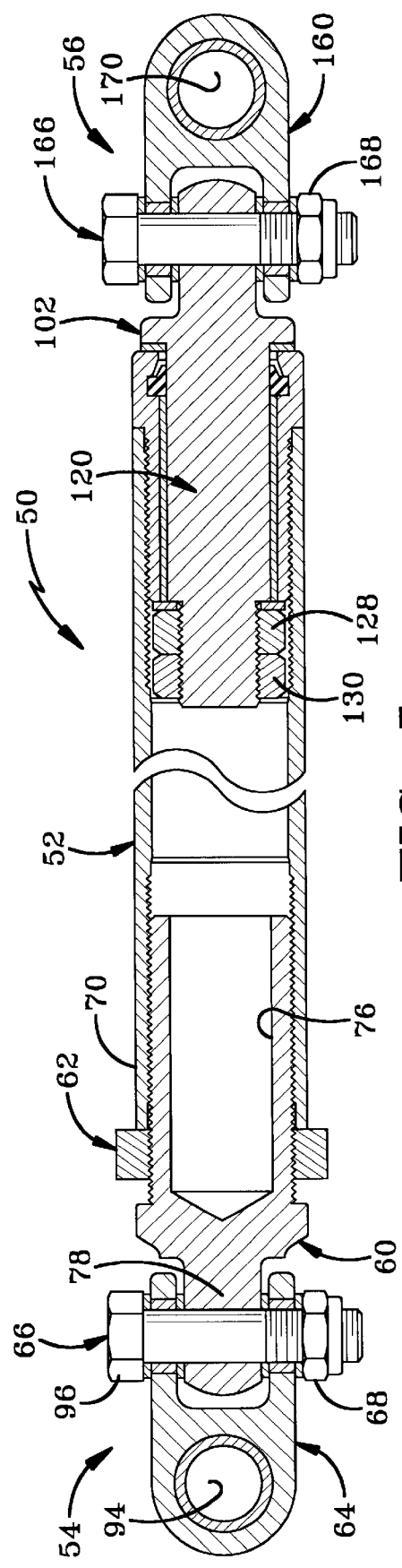

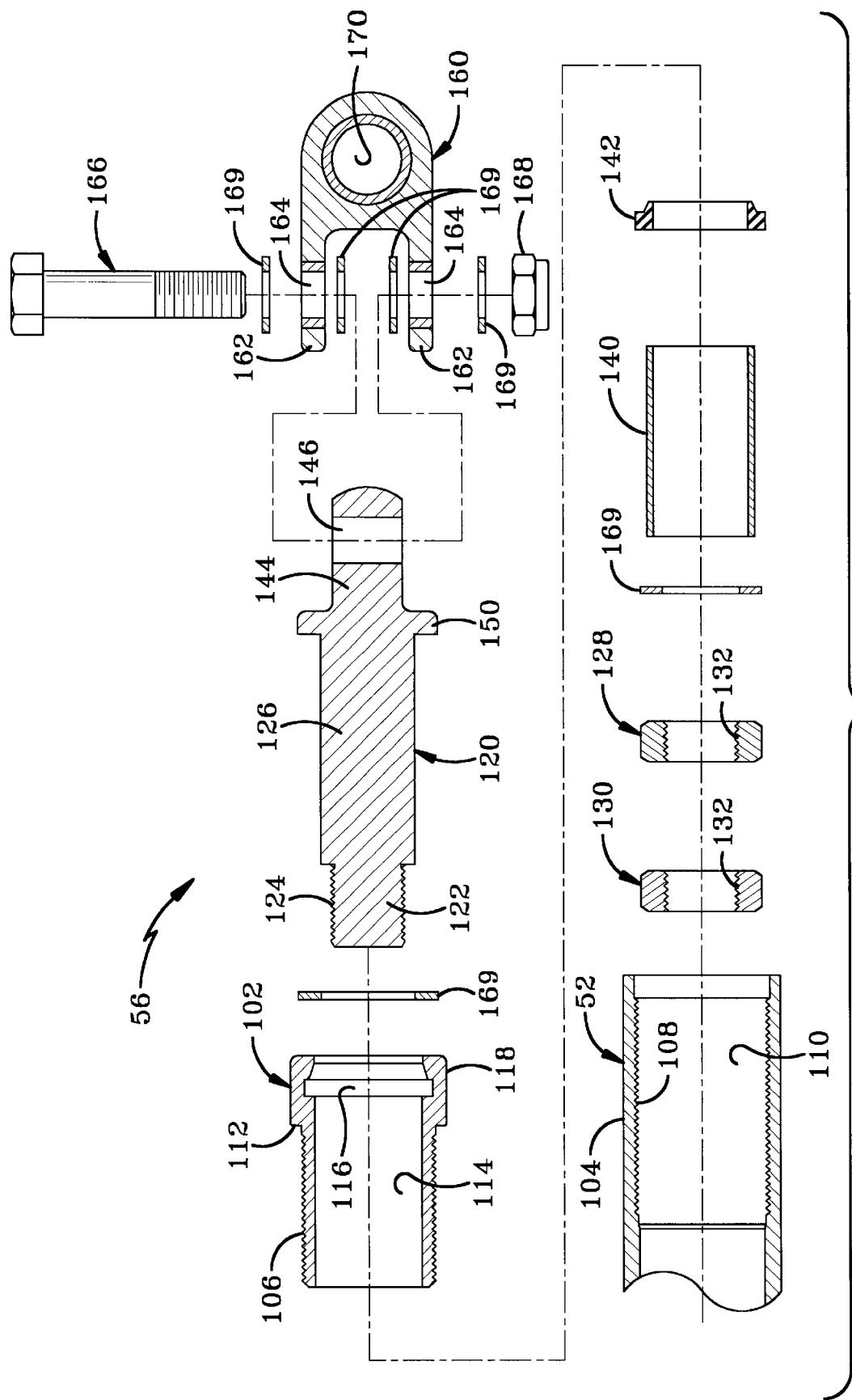

TIE BAR AND MOUNT FOR BOAT DRIVES

BACKGROUND OF THE INVENTION

1. Technical Field

The present invention generally relates to boat drive mounting configurations and, more particularly, to the tie bars and the mounts used to connect the boat drives to the steering system and to each other.

2. Background Information

Many different types of boats use multiple drives to power the boat. Whether these drives are inboard or outboard, the drives must be synchronized to efficiently power the boat. The typical prior art synchronization arrangement is depicted in FIGS. 1–3 wherein tie bars 10 extend between the drives 12. Tie bars 10 are connected to mounting flanges 14 that extend from the portions of drives 12 that project out from the rear of the boat 16.

Prior art mounting arrangements such as the one depicted in FIGS. 1–3 do not completely synchronize drives 12 when drives 12 are turned as depicted in FIG. 2. The incomplete synchronization results in inefficient drive arrangement in the turns and boat 16 loses power. FIG. 2 depicts a turning configuration wherein angle A is different from angle B which is different from angle C. The differences in these angles are caused by the relationship between mounting flanges 14 and the centerlines of drives 12. The art desires a mounting configuration that allows drives 12 to turn at identical angles. The interconnections between drives 12 must also compensate for different vertical offsets depending on the vertical locations of drives 12 with respect to boat 16.

Another problem with prior art mounting configurations is that tie bars 10 used to connect drives 12 rapidly wear when each tie bar 10 rotates about its longitudinal axis. Such rotation is caused when drives 12 turn back and forth. The wear is also caused by the constant vibration experienced by each tie bar 10. Worn tie bars 10 become loose and do not accurately turn drives 12. Boat owners do not like changing the bars and desire an engineered, high-quality tie bar designed to withstand the operating environment over time. The boat owner must also replace worn bars. Severely worn bars create a dangerous situation where control over a drive may be lost suddenly. The art thus desires a tie bar configuration that may continuously rotate in a manner that does not loosen the bar.

Another problem with some prior art systems is that the rotation of the tie bar changes the length of the bar. The length of the bar changes because the bar includes threaded parts. Such rotation is undesirable because of the length change and the wear between the threaded parts.

Another drawback with prior art mounting configurations is that the brackets and mounting flanges connected to drives 12 cannot be adjusted and do not provide connection arrangements that may be selectively reconfigured for different types of drives 12 and different types of boats 16. The art desires a drive mount that can accommodate a variety of drive configurations.

BRIEF SUMMARY OF THE INVENTION

The invention provides a drive mounting configuration wherein the drives of a boat are connected together at their centerlines so that the drives are turned at equal angles and are synchronized by the steering system of the boat.

The invention provides a tie bar used to interconnect the drives wherein the tie bar is designed to repeatedly and reliably rotate 360 degrees in the same direction without loosening or changing its length.

The invention also provides a reconfigurable mount that is adapted to be connected to the portion of the drive that extends from the back of the boat. The mount may be configured in a right hand, center, double, or left hand configuration. The mounts may also support different vertical offset mounting configurations in a reliable manner using a single mounting pin and spacer combination.

BRIEF DESCRIPTION OF THE SEVERAL VIEWS OF THE DRAWINGS

FIG. 4 is an elevation view of the tie bar of the invention.

FIG. 5 is a longitudinal section view of the tie bar of the invention.

FIG. 6B is an exploded view of the second end of the tie bar of the invention.

Similar numbers refer to similar parts throughout the specification.

DETAILED DESCRIPTION OF THE INVENTION

Figure 1:
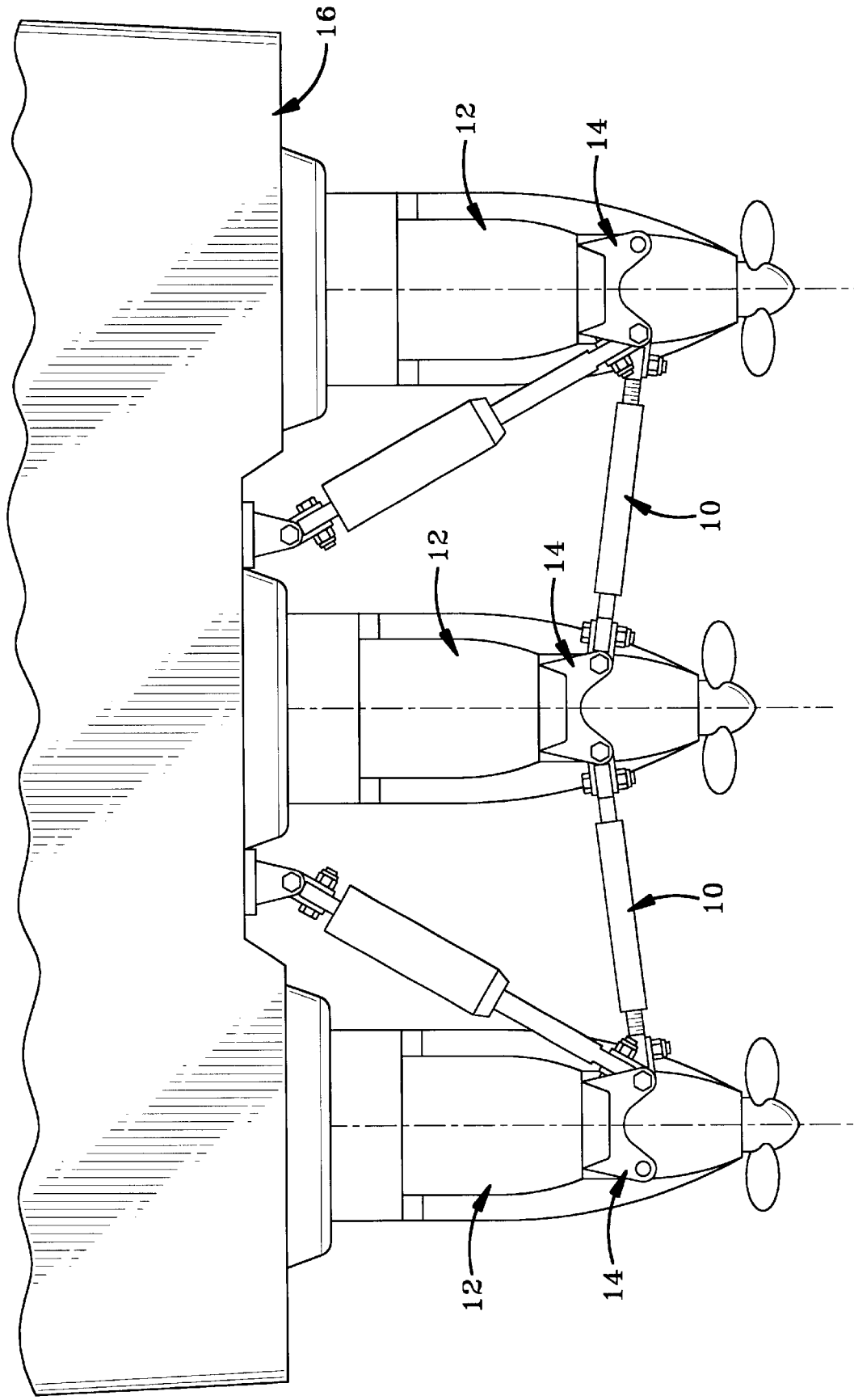
FIG. 1 is a top plan view of the rear portion of a boat with three propulsion units or drives connected with prior art tie bars connected to prior art mounting flanges.

The tie bar of the present invention is indicated generally by the numeral 50 in the accompanying drawings. Tie bar 50 is adapted to continuously rotate about its longitudinal axis without changing its overall length and without loosening. Tie bar 50 is also configured to reliably experience the continuous vibrational forces created by a boat.

Tie bar 50 includes a centrally-disposed, outer tube 52, a first end assembly 54 connected to outer tube 52, and a second end assembly 56 connected to outer tube 52. Outer tube 52 may be provided in different lengths in order to alter the overall length of tie bar 50. First and second end assemblies 54 and 56 are adapted to connect with the drives of the boat in a variety of different mounting configurations. In the embodiment of the invention depicted in the drawings, second end assembly 56 is adapted to rotate in one direction continuously without changing the overall length of tie bar 50 and without loosening. Second end assembly 56 thus provides significant benefits to tie bar 50 over prior art tie bars.

Figure 6A:
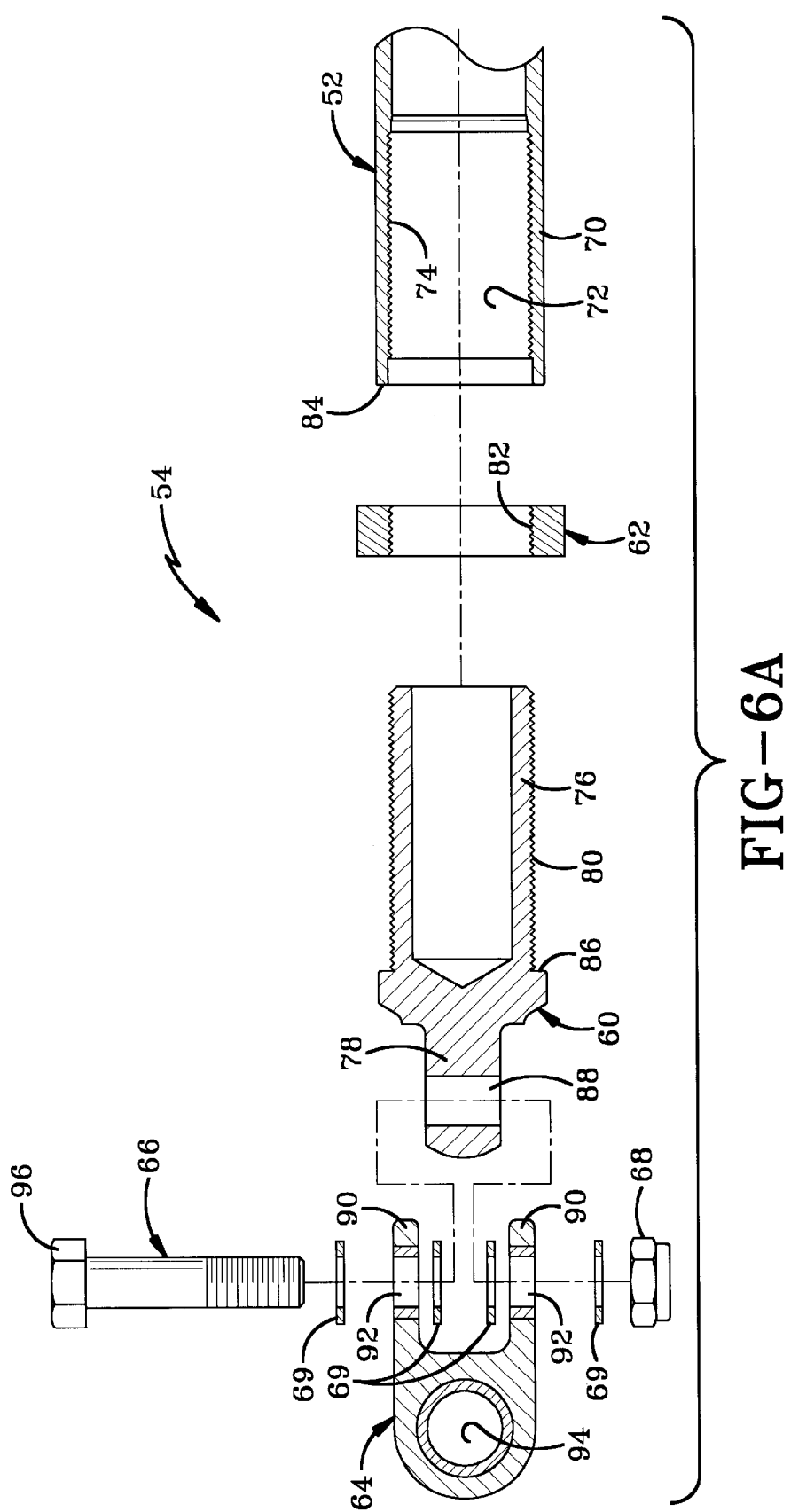
FIG. 6A is an exploded view of the first end of the tie bar of the invention.

First end assembly 54 (FIG. 6A) generally includes a first threaded lug 60, a lock nut 62, a linkage 64, a pivot pin 66, and a pivot pin lock nut 68. First end assembly 54 may also include bearings or bushings 69 that are designed to reduce friction and wear between the moving parts of end assembly 54. These elements of first end assembly 54 cooperate together to allow the first end of tie bar 50 to pivot with respect to the mounting flange to which it is mounted. First end assembly 54 also provides for fine length adjustment of tie bar 50 through the threaded engagement between threaded lug 60 and outer tube 52.

Outer tube 52 includes a first end 70 that defines a recess 72. The inner surface of first end 70 defines a thread 74 that projects inwardly into recess 72. Threaded lug 60 includes a first end 76 and a second end 78. The outer surface of first end 76 defines a thread 80 that is adapted to cooperate and threadably engage thread 74 of outer tube 52 such that threaded lug 60 may be screwed into first end 70 of outer tube 52. The length of threads 74 and 80 as well as the lengths of first ends 70 and 76 define the overall length of the fine adjustment of tie bar 50. The overall length of tie bar may be finely adjusted by turning threaded lug 60 with respect to outer tube 52 to move threaded lug 60 inwardly and outwardly with respect to outer tube 52.

Lock nut 62 is used to lock the position of threaded lug 60 with respect to outer tube 52. Lock nut 62 has an inner surface that defines a thread 82 that is substantially similar to thread 74 such that thread 82 will threadably engage thread 80 so that lock nut 62 may be screwed onto threaded lug 60. Lock nut 62 is screwed onto threaded lug 60 before threaded lug 60 is screwed into outer tube 52. Once the position of threaded lug 60 is set with respect to outer tube 52, lock nut 62 is rotated until it abuts the end 84 of outer tube 52. Lock nut 62 is tightened against end 84 to create a locking force between threads 74, 80, and 82. Threaded lug 60 provides a stop wall 86 to prevent lock nut 62 from moving off of first end 76.

Second end 78 of lug 60 defines an opening 88 adapted to slidably receive pivot pin 66. Opening 88 is preferably slightly larger than the outer diameter of pivot pin 66 so that a tight connection between second end 78 and pivot pin 66 is formed when pivot pin 66 is slidably received in opening 88. The dimensions allow lug 60 to pivot about pin 66.

Linkage 64 defines a pair of opposed ears 90 adapted to slidably extend over second end 78 of threaded lug 60. Each ear 90 defines an opening 92 sized to slidably receive pivot pin 66 in the same manner as opening 88. Linkage 64 also defines an opening 94 adapted to slidably receive a connection pin 98 that mounts linkage 64 to a mounting flange as described below.

Pivot pin 66 defines a flange 96 that is adapted to engage the outer surface of ear 90 when pivot pin 66 is positioned in openings 92 of ears 90. Flange 96 prevents pivot pin 66 from slipping through ears 90 and allows linkage 64 to freely pivot with respect to pivot pin 66 and threaded lug 60. Lock nut 68 threadably engages pivot pin 66 in a locking arrangement to prevent pin 66 from loosening once pin 66 is disposed through linkage 64 and threaded lug 60. Lock nut 68 may be any of a variety of lock nuts known in the art that function without compressing pivot pin 66 against linkage 64 so that free pivotal movement may be provided.

Second end assembly 56 (FIG. 6B) is adapted to provide the 360 degree continuous rotation feature of tie bar 50. Second end assembly 56 provides the continuous rotation while not changing the length of second end assembly 56 or the length of tie bar 50. Second end assembly 56 is also configured to remain tight and fully functional while experiencing vibrational forces.

Second end assembly 56 generally includes a threaded insert 102 that is threaded into the second end 104 of outer tube 52. Threaded insert 102 has an outer surface that defines an outwardly disposed thread 106 that is configured to threadably cooperate with an inwardly disposed thread 108 that projects into the recess 110 defined by second end 104 of outer tube 52. Threaded insert 102 includes a flange 112 configured to abut the end of outer tube 52 as depicted in FIG. 5. Flange 112 may be configured to have the same outer diameter as outer tube 52 so that the transition between outer tube 52 and threaded insert 102 is smooth. Threaded insert 102 defines a bore 114 that is symmetric about the longitudinal axis of threaded insert 102. Bore 114 is substantially cylindrical. Insert 102 defines a seal-receiving recess 116 disposed at the outer end 118 of threaded insert 102. Recess 116 is a continuous part of bore 114.

Second end assembly 56 also includes a second lug 120 (the first lug being a part of first end assembly 54) that is slidably positioned through threaded insert 102 and is designed to rotate within threaded insert 102 when end assembly 56 is assembled. Lug 120 has a first end 122 that defines an outwardly disposed thread 124. As depicted in FIGS. 5 and 6B, first end 122 is stepped down (has a smaller diameter than) from the main body portion 126 of lug 120 so that lock nuts 128 and 130 may be threaded onto first end 122 while being disposed inside second end 104 of outer tube 52. Each lock nut 128 and 130 is configured to be threaded onto first end 122 of lug 120. Each lock nut 128 and 130 thus includes an inwardly projecting thread 132 that cooperates with thread 124. The outer diameter of each lock nut 128 and 130 is less than the outer diameter of the threaded portion of threaded insert 102 as depicted in FIG. 5 so that nuts 128 and 130 fit within tube 52.

Second end assembly 56 further includes a sleeve 140 that slides over body 126 of lug 120 and inside threaded insert 102 to allow lug 120 to easily rotate within threaded insert 102. Sleeve 140 may be fabricated from brass or other materials that promote a rotation or sliding movement between two metal parts. Brass is found to be useful when threaded insert 102 and second lug 120 are fabricated from stainless steel.

Sleeve 140 is held in place with a seal 142 that is seated in recess 116 defined by threaded insert 102. Seal 142 keeps lubricants used to reduce friction between sleeve 140, lug 120, and threaded insert 102 from exiting tie bar 50.

Lug 120 includes a flange 150 configured to abut outer end 118 of threaded insert 102 as depicted in FIG. 5. The second end 144 of lug 120 projects outwardly from flange 150 and defines an opening 146 similar to opening 88 described above.

Second end assembly 56 further includes a linkage 160 that functions similar to and is connected to second end 144 of lug 120 in a manner similar to that described above with respect to linkage 64. As such, linkage 160 includes ears 162 that each define an opening 164. Openings 164 are aligned to receive a pivot pin 166 that is locked in position with a lock nut 168. Linkage 160 also defines an opening 170 to allow linkage 160 to function in the same manner as linkage 64 described above. As described above with respect to first end assembly 54, second end assembly 56 may be equipped with bearings or bushings 169 to reduce friction and wear between the moving parts of second end assembly 56.

When assembled and in operation, second end assembly 56 provides free rotation to tie bar 50 because second lug 120 may freely rotate with respect to threaded insert 102. Threaded insert 102 is threaded to outer tube 52 and does not loosen because it receives substantially no torque forces. The threads between threaded insert 102 and outer tube 52 may be coated with a substance that locks the position of the threads so that the position of threaded insert 102 is locked with respect to outer tube 52. Second lug 120 may continuously rotate through multiple 360 degree revolutions without changing the length of tie bar 50 and without loosening any element of second end assembly 56.

The second end assembly 56 is assembled by snapping seal 142 into recess 116. Sleeve 140 is then slid over body 126 and the combination of lug 120 and sleeve 140 is slid into threaded insert 102. Lock nuts 128 and 130 are threaded onto lug 120. This assembly is then threaded into second end 104 of outer tube 52. Linkage 160 is then connected to lug 120 to form second end assembly 56.

Figure 2:
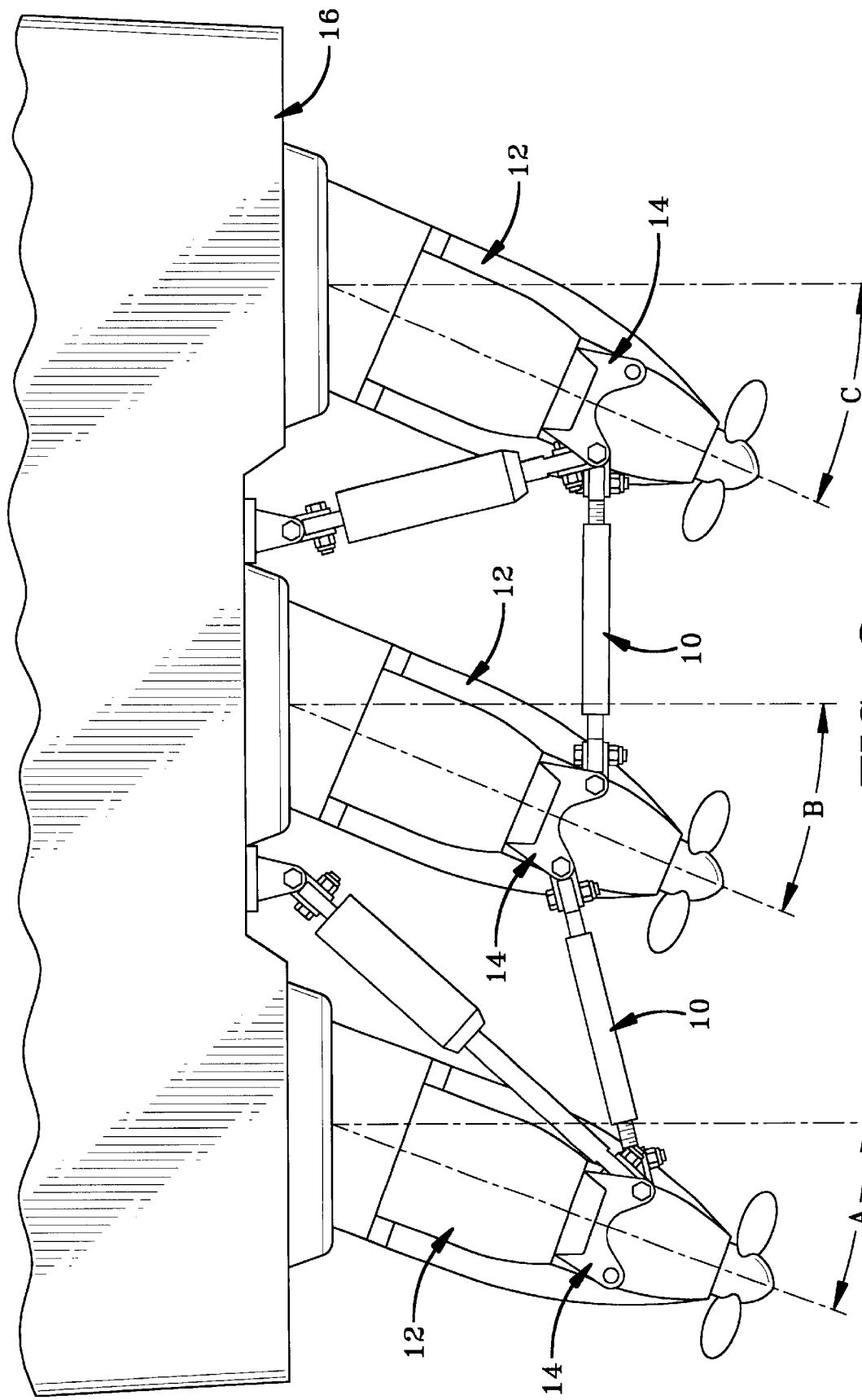
FIG. 2 is a view similar to FIG. 1 showing the prior art drive connection turned to a first position.
Figure 3:
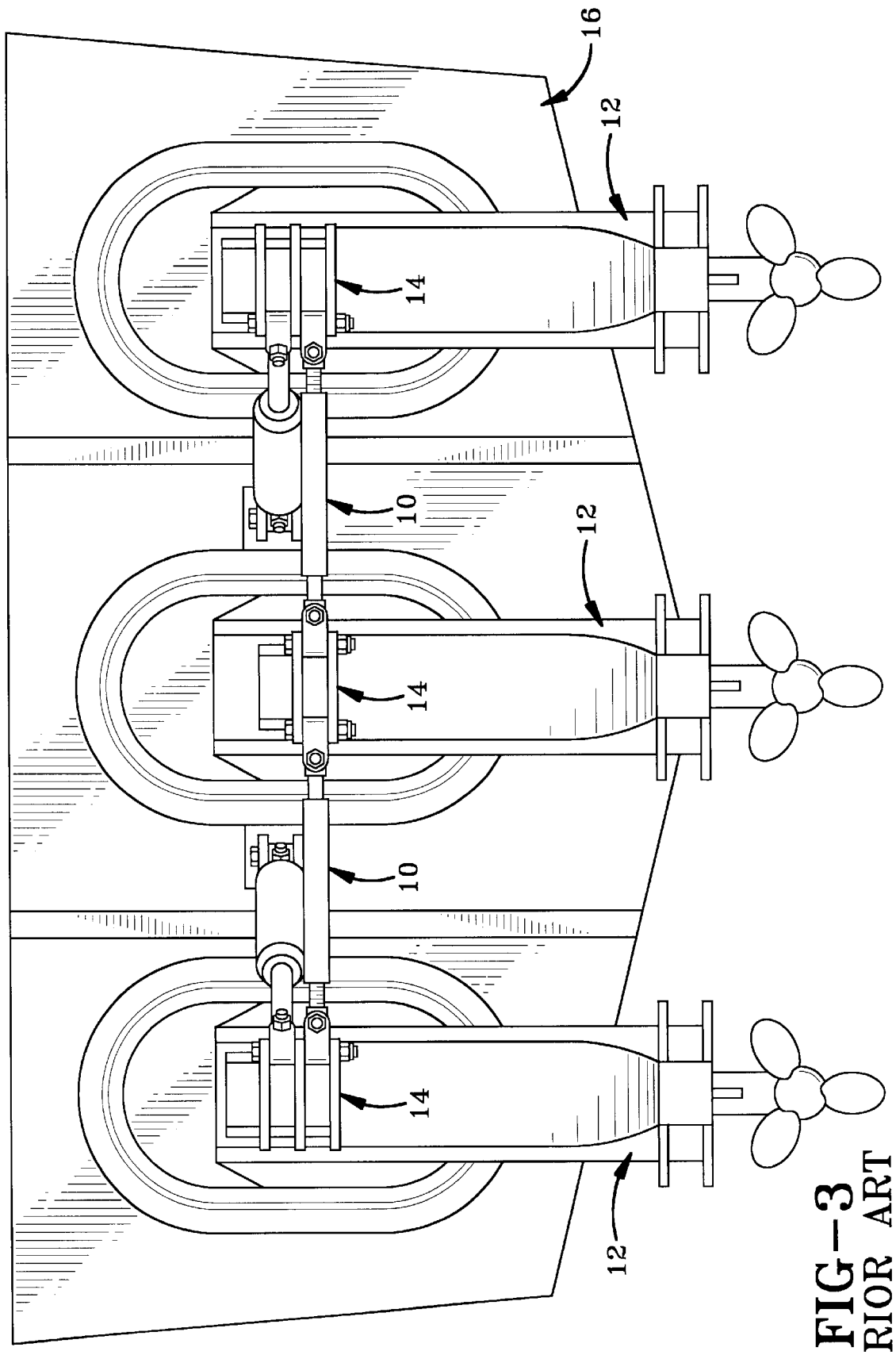
FIG. 3 is an end view of the prior arrangement of FIG. 1.
Figure 7:
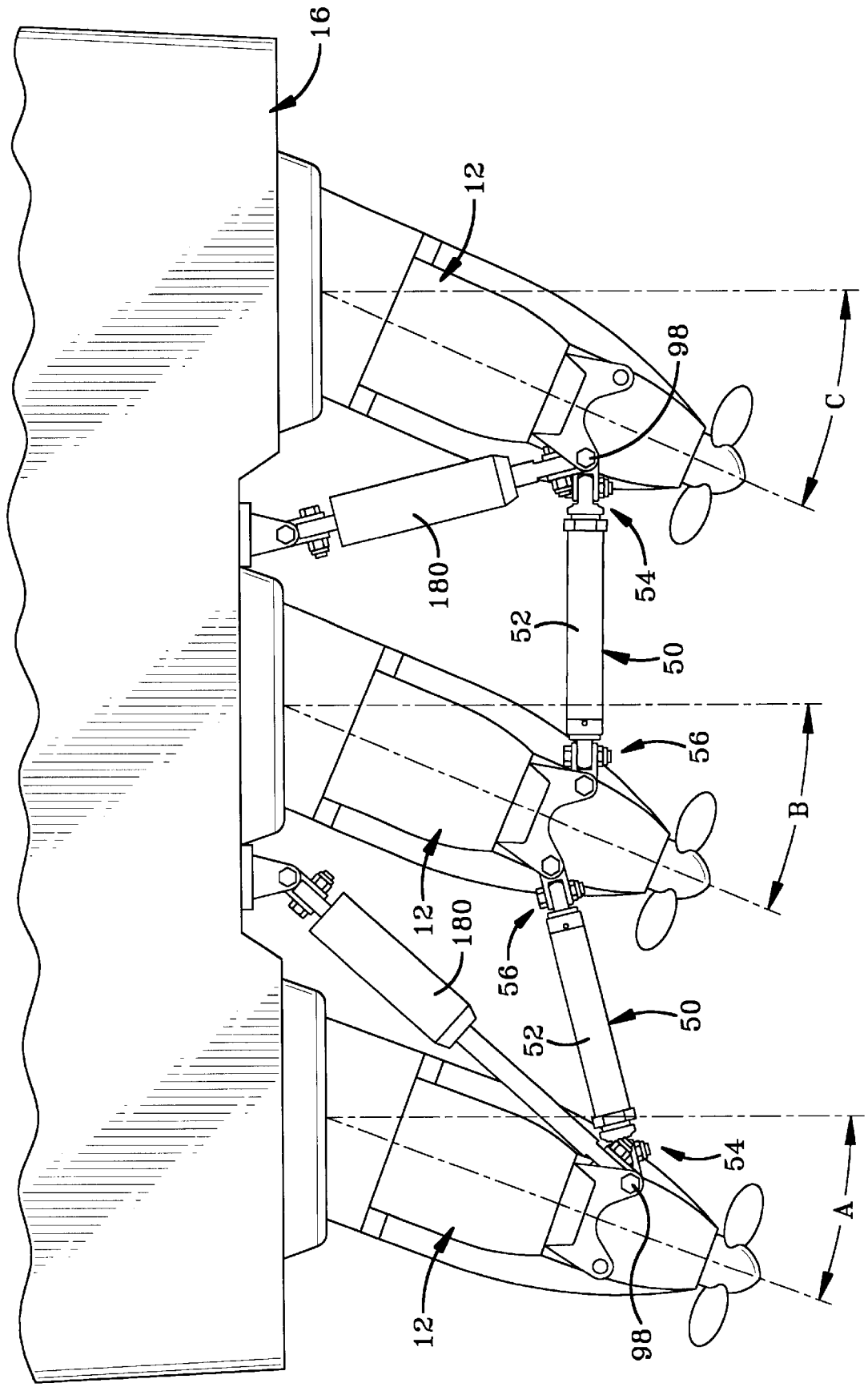
FIG. 7 is a top plan view of the drives of FIG. 1 connected with the tie bars of the present invention.

FIG. 7 depicts the prior art drive arrangement with drives 12 connected with tie bars 50. A pair of steering cylinders 180 are connected to drives 12 to move them back and forth. Although this motor mounting configuration has the same non-synchronized angles A, B, C described above with respect to FIG. 2, tie bars 50 still provide a benefit because of their longevity and reliability.

Figure 8:
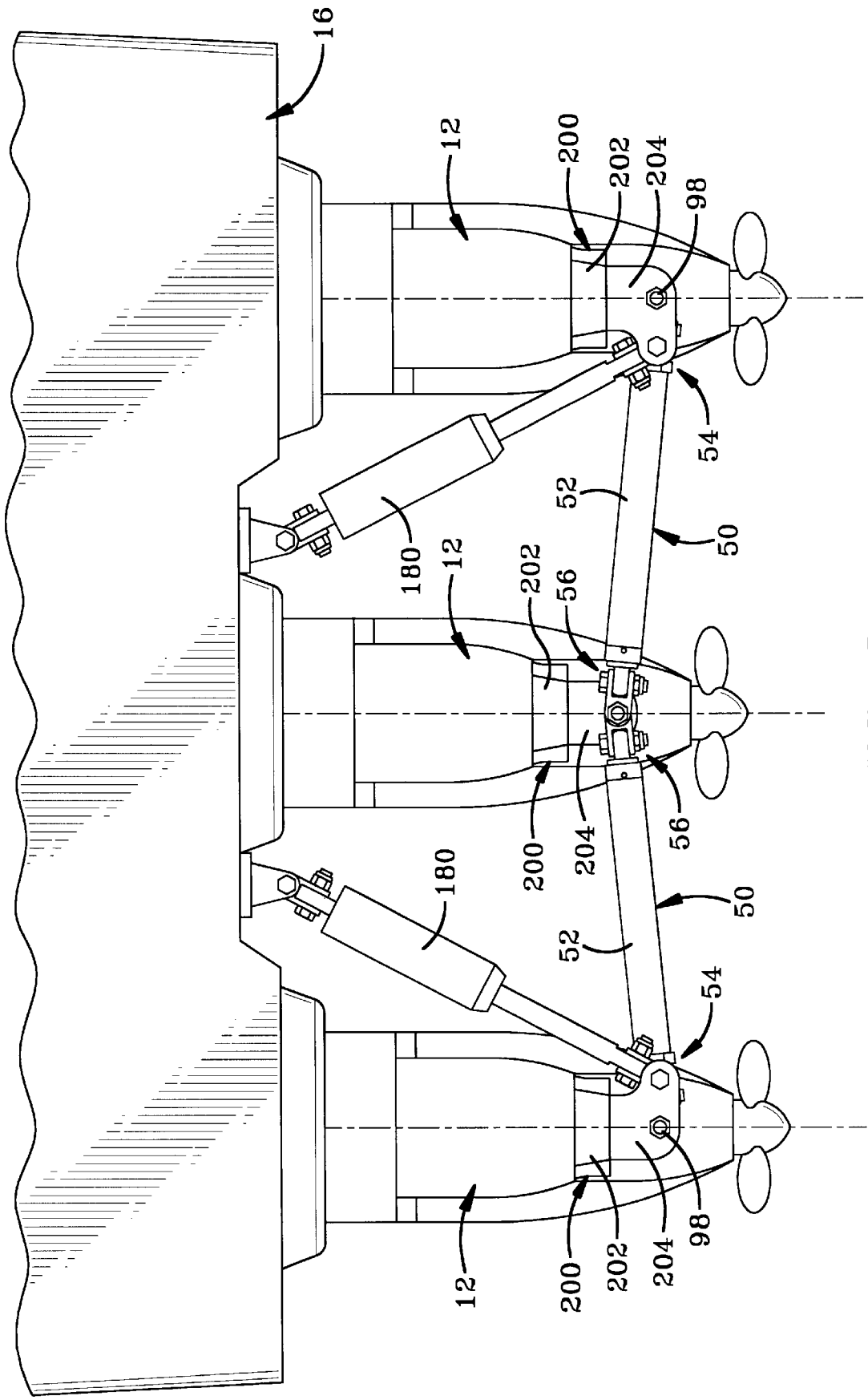
FIG. 8 is a top plan view of the rear portion of a boat with three drives connected with the tie bars of the present invention wherein the connection configuration is adapted to turn each drive at the same angle with respect to the boat.
Figure 9:
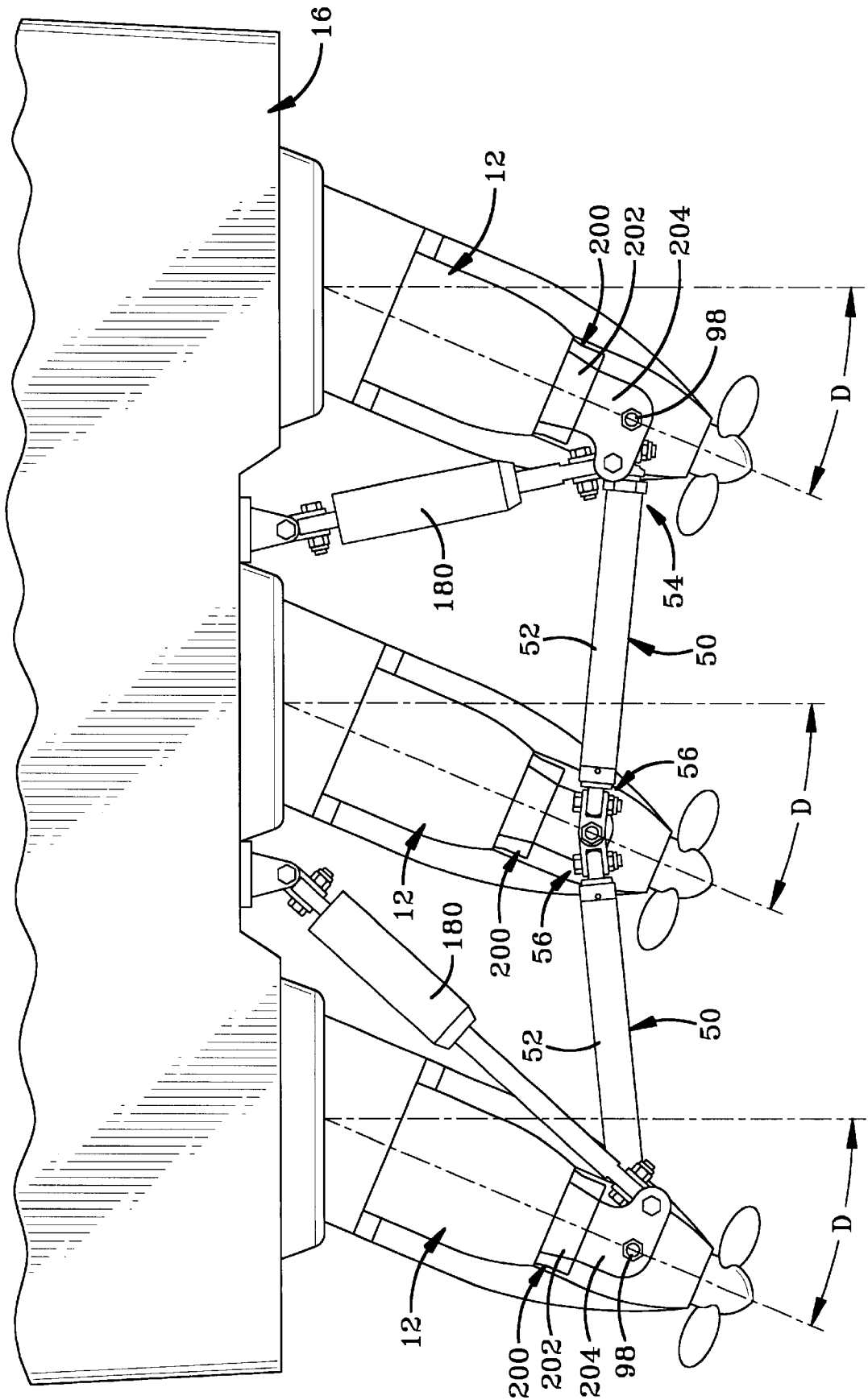
FIG. 9 is a view similar to FIG. 8 showing the drives turned to a first position.
Figure 10:
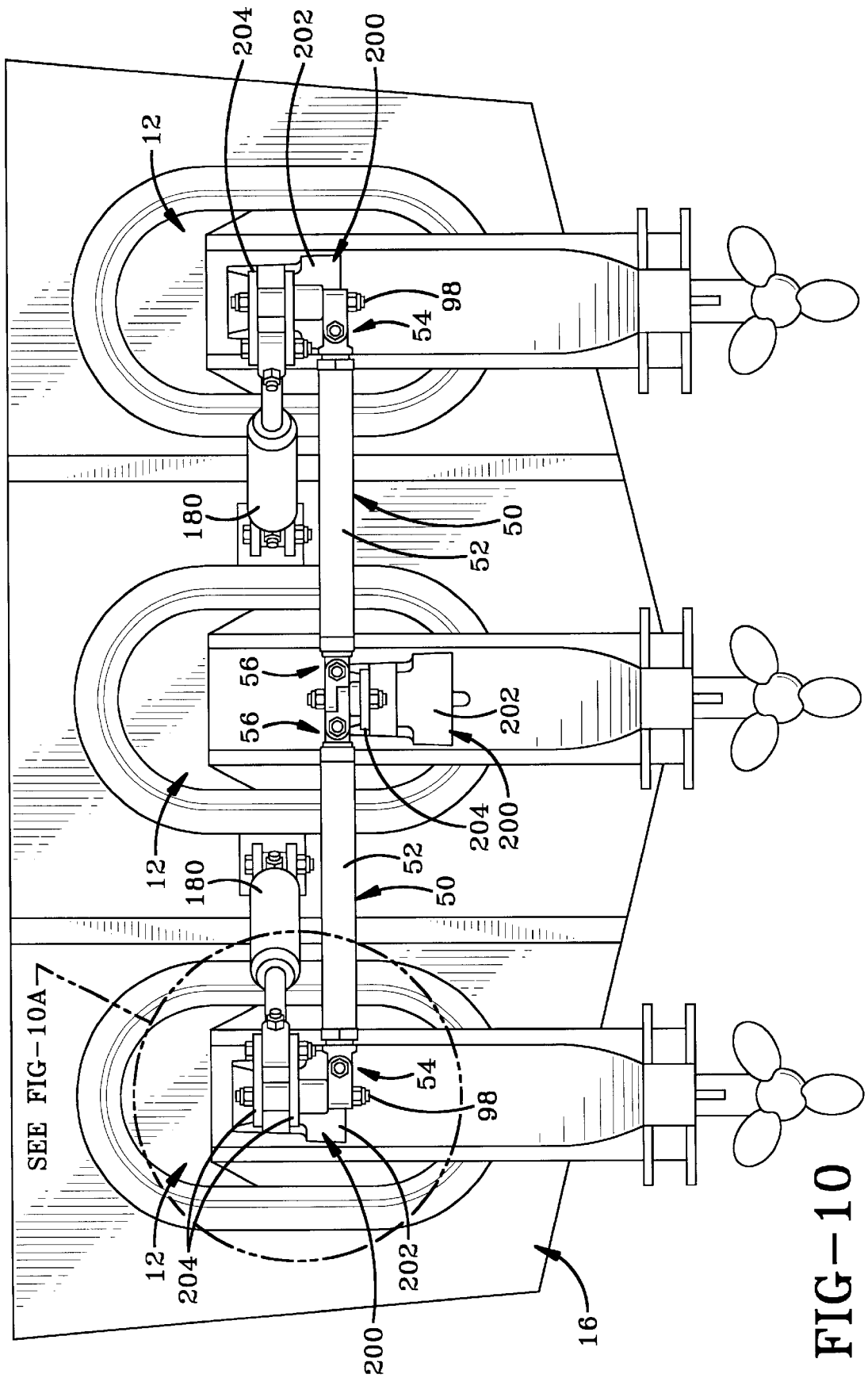
FIG. 10 is an end view of FIG. 8 showing a first mounting configuration.
Figure 11:
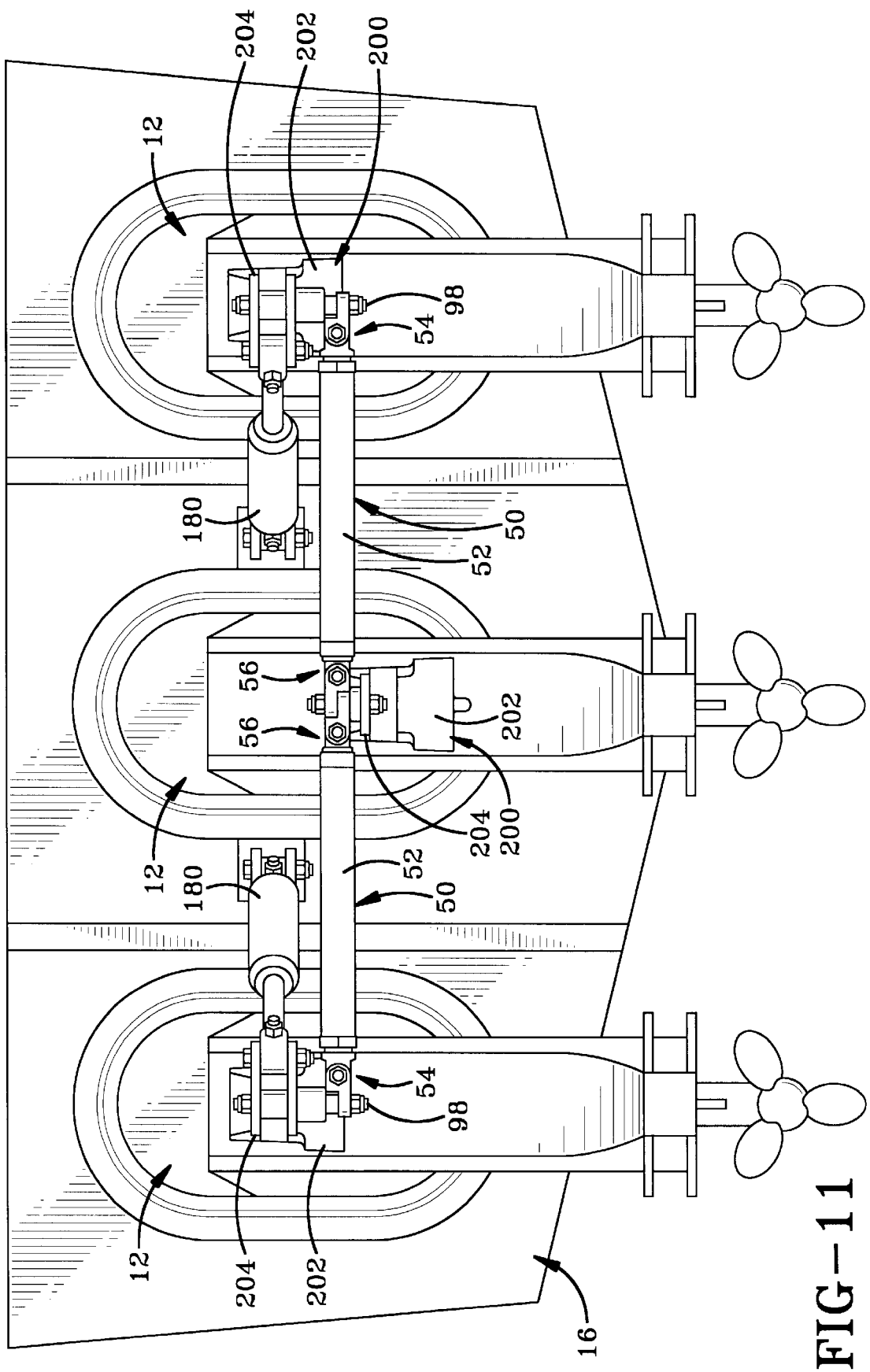
FIG. 11 is a view similar to FIG. 10 showing a second mounting configuration.
Figure 12:
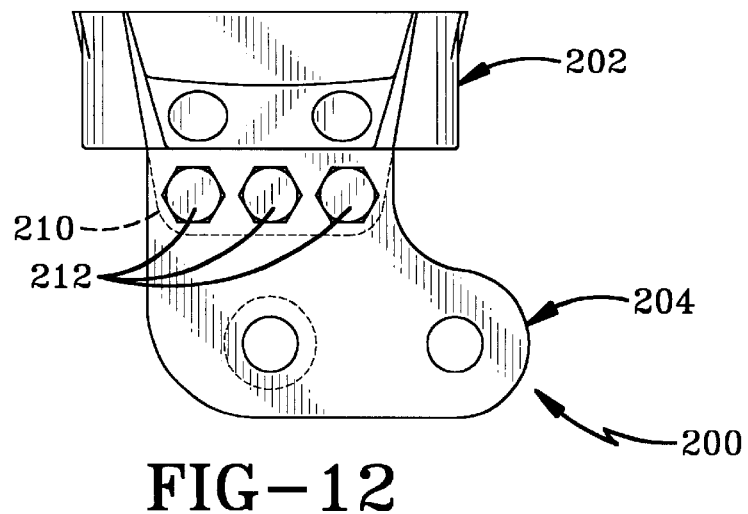
FIG. 12 is a top plan view of a reconfigurable mounting bracket according to the present invention in a first configuration.

FIG. 8 depicts an improved motor mounting configuration wherein drives 12 are connected centerline to centerline with tie bars 50. FIG. 9 shows that this motor mounting configuration results in synchronized drives 12 because each turning angle D is equal. FIG. 10 shows the use of overlapped linkages on the center drive to provide the centerline-mounted configuration. FIG. 10 also shows that the mounts 200 on drives 12 may be vertically offset from each other. The connectors 98 disclosed herein provide for different offsets while providing increased reliability and durability. Connectors 98 include spacers 184 that accommodate the vertical offset. FIG. 11 shows a different mounting configuration wherein a different vertical offset is required. In this mounting configuration, each linkage is a half overlap linkage so that each tie bar 50 is moved upwardly half the thickness of a linkage. Different offsets may also be provided by altering the lengths of connectors 98 or spacers 184.

Figure 10A:
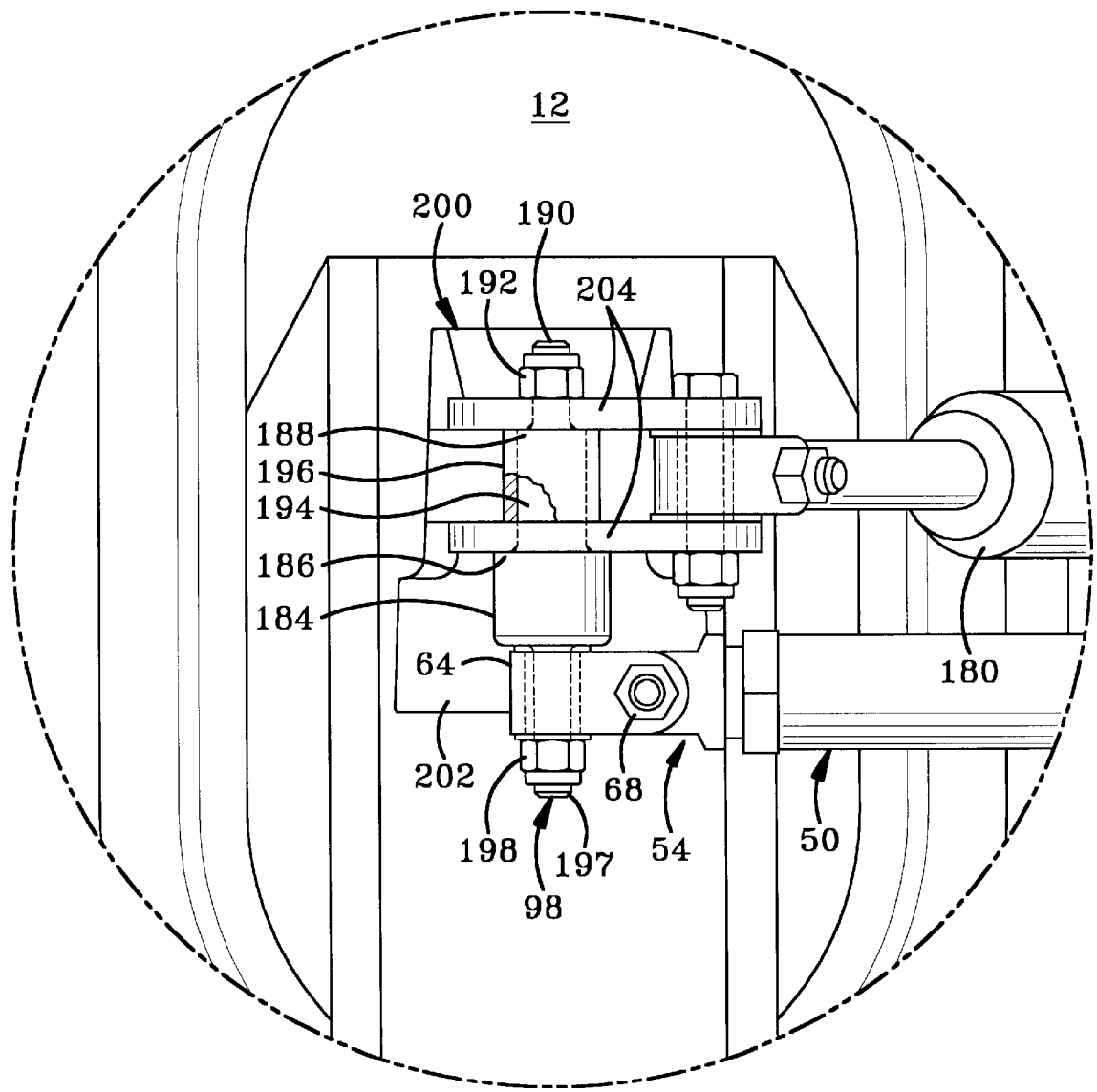
FIG. 10A is an enlarged view of the encircled portion of FIG. 10.

As shown in FIG. 10A by way of example, each connector 98 includes a first shoulder 186 and a second shoulder 188 configured to abut the lower (or upper when reversed) side of the flanges 204 of mounts 200. The body also includes a first end 190 that slides through flange 204 and receives a lock nut 192. The body further includes a central shank 194 that is disposed between flanges 204 when connector 98 is installed. A compression spacer 196 is slidable disposed on shank 194 to support flanges 204 when they are forced toward each other. Spacer 184 is disposed intermediate shank 194 and a second end 197. Second end 197 slides through linkage 64 and receives lock nut 198.

Figure 13:
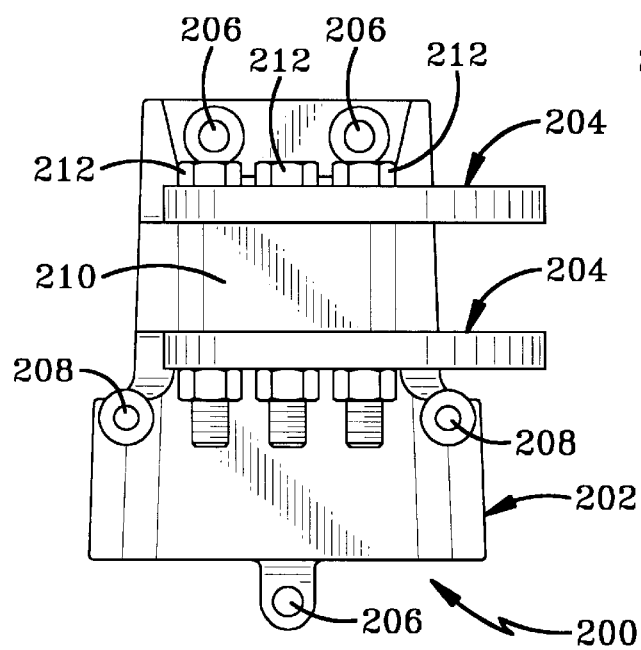
FIG. 13 is a front elevation view of the mounting bracket of FIG. 12.
Figure 14:
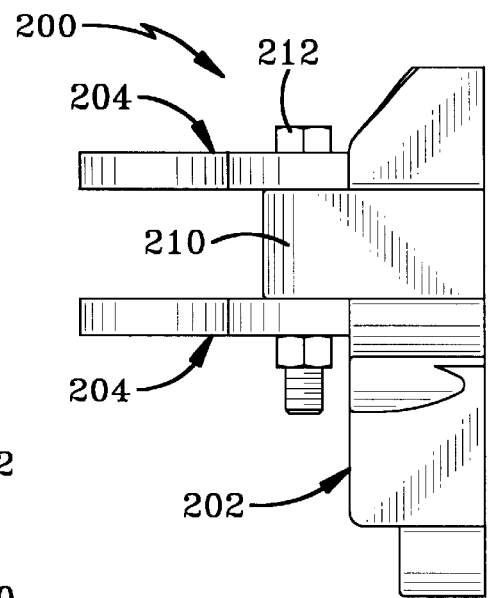
FIG. 14 is a right side elevation view of FIG. 13.
Figure 15:
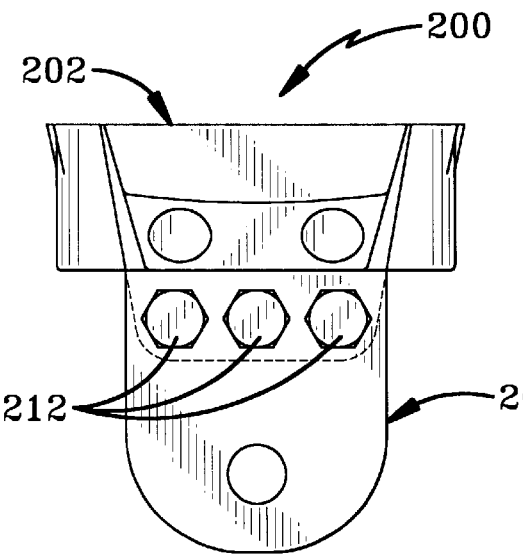
FIG. 15 is a top plan view of the reconfigurable mounting bracket of the invention in a second or center configuration.
Figure 16:
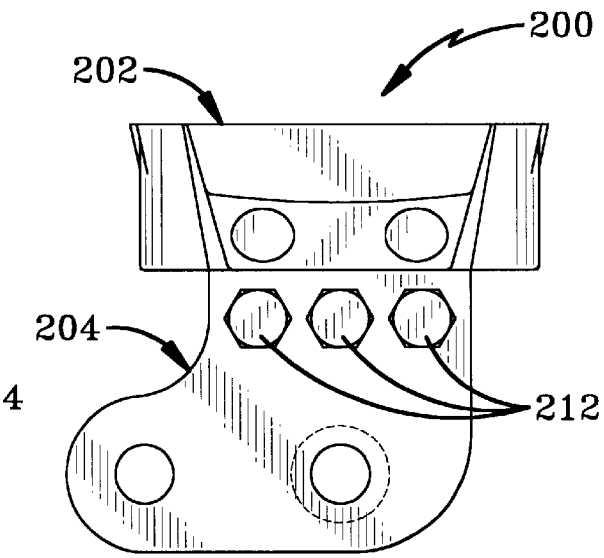
FIG. 16 is a top plan view of the reconfigurable mounting bracket in a third configuration that is opposite to the configuration of FIG. 12.
Figure 17:
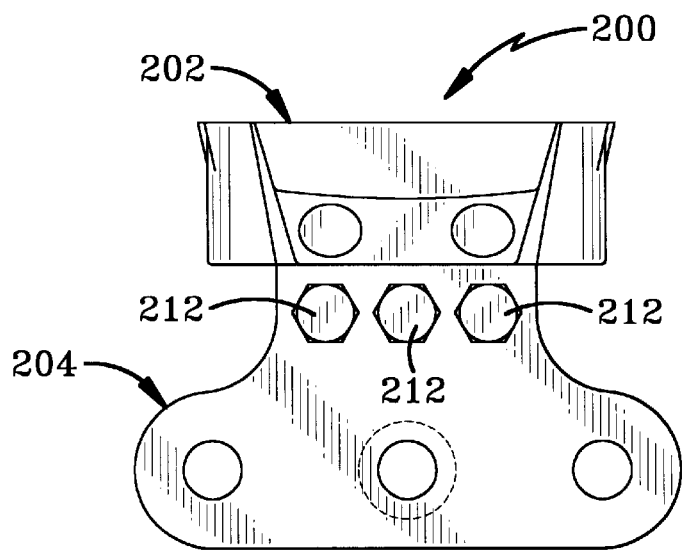
FIG. 17 is a top plan view of the reconfigurable mounting bracket in a fourth or double configuration.

In accordance with one of the objectives of the invention, motor mount 200 includes components that may be assembled in different configurations as shown in FIGS. 12–17. Motor mount 200 may be configured in a right hand (FIG. 12), center (FIG. 15), left hand (FIG. 16), or double (FIG. 17) configuration as needed to work with drives 12 described above. Each motor mount 200 includes a base 202 and a mounting flange 204. Each reconfigurable motor mount 200 may be used with a pair of opposed mounting flanges 204 that clamp against base 202 as depicted in FIGS. 13 and 14. In other embodiments or configurations, motor mount 200 may be used with a single flange 204 as depicted in FIGS. 18–21. A right hand flange may be removed from base 202 and flipped over to create a left hand flange.

Base 202 defines a plurality of mounting holes 206 that are used to receive connectors that hold base 202 to drive 12. At least three of mounting holes 206 are formed as through holes. In one embodiment of the invention, base 202 defines a pair of false holes 208 that may be used to receive a connector if the extra two connectors are desired or if drive 12 provides for five connectors instead of three. False holes 208 may be indentations instead of through holes. When holes 208 are used, holes 208 are punched or drilled through so that they may receive the appropriate connector.

Base 202 defines a protuberance 210 having an upper surface and a lower surface that receives mounting flanges 204. The upper and lower surfaces of protuberance 210 are preferably substantially parallel and substantially flat. Protuberance 210 defines at least two but preferably three connector openings that receive connectors 212 that are used to connect flanges 204 to base 202. Connectors 212 clamp mounting flanges 204 against protuberance 210.

Figure 18:
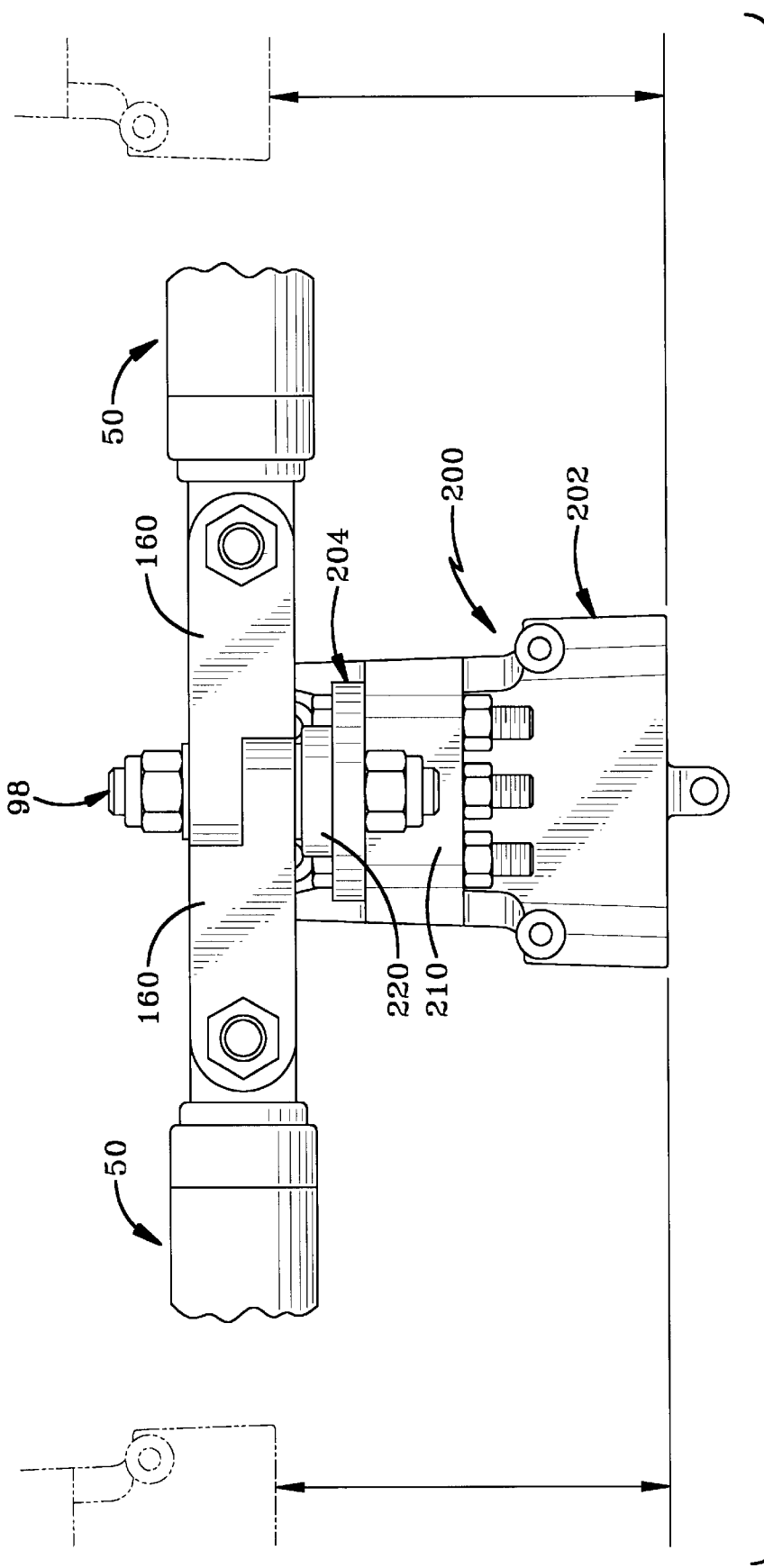
FIG. 18 is a front elevation view of the second mounting configuration of the mounting bracket with overlapped tie bar ends connected to the mounting bracket in a first mounting position.
Figure 19:
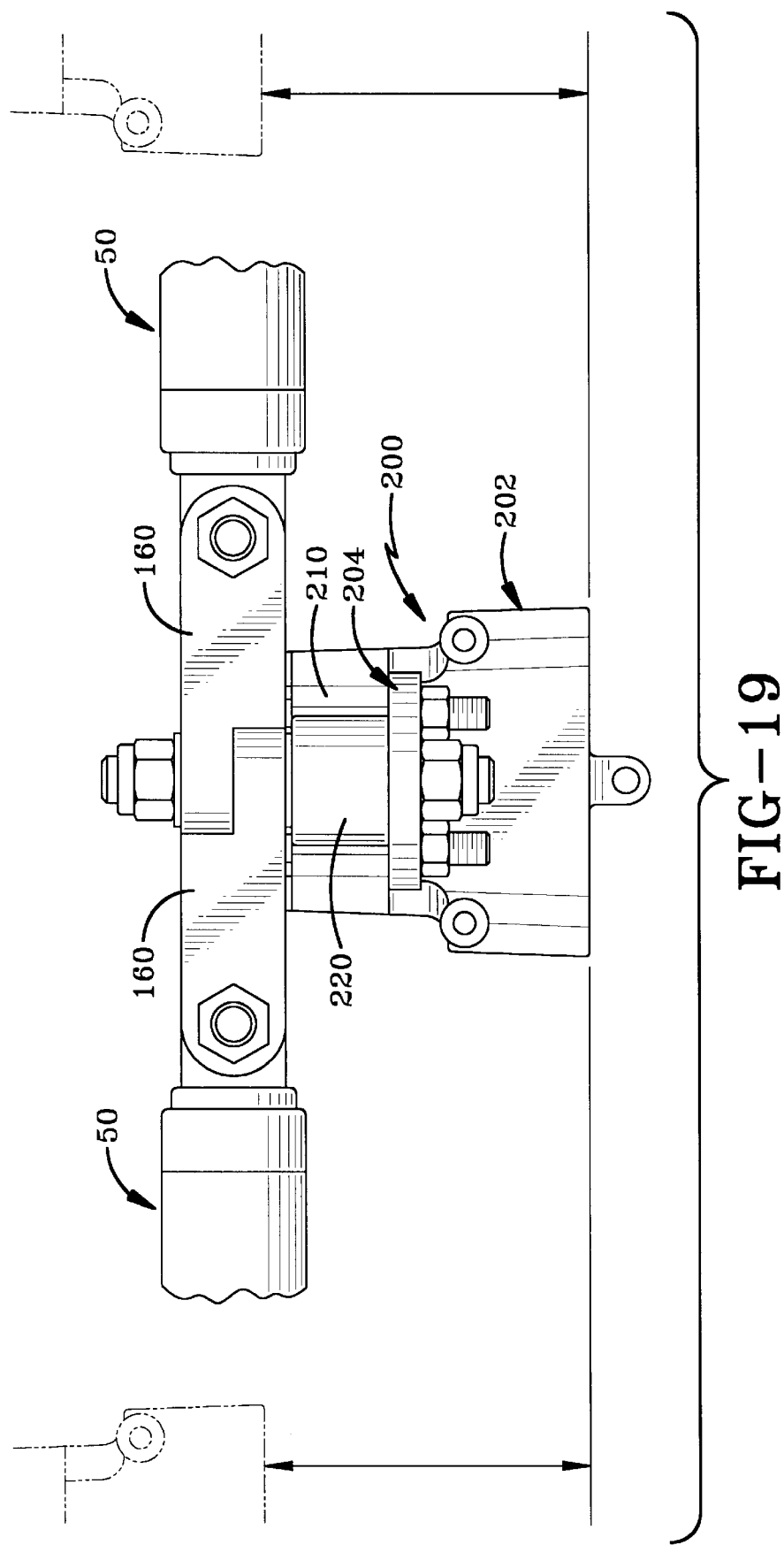
FIG. 19 is a view similar to FIG. 18 showing a second mounting position.
Figure 20:
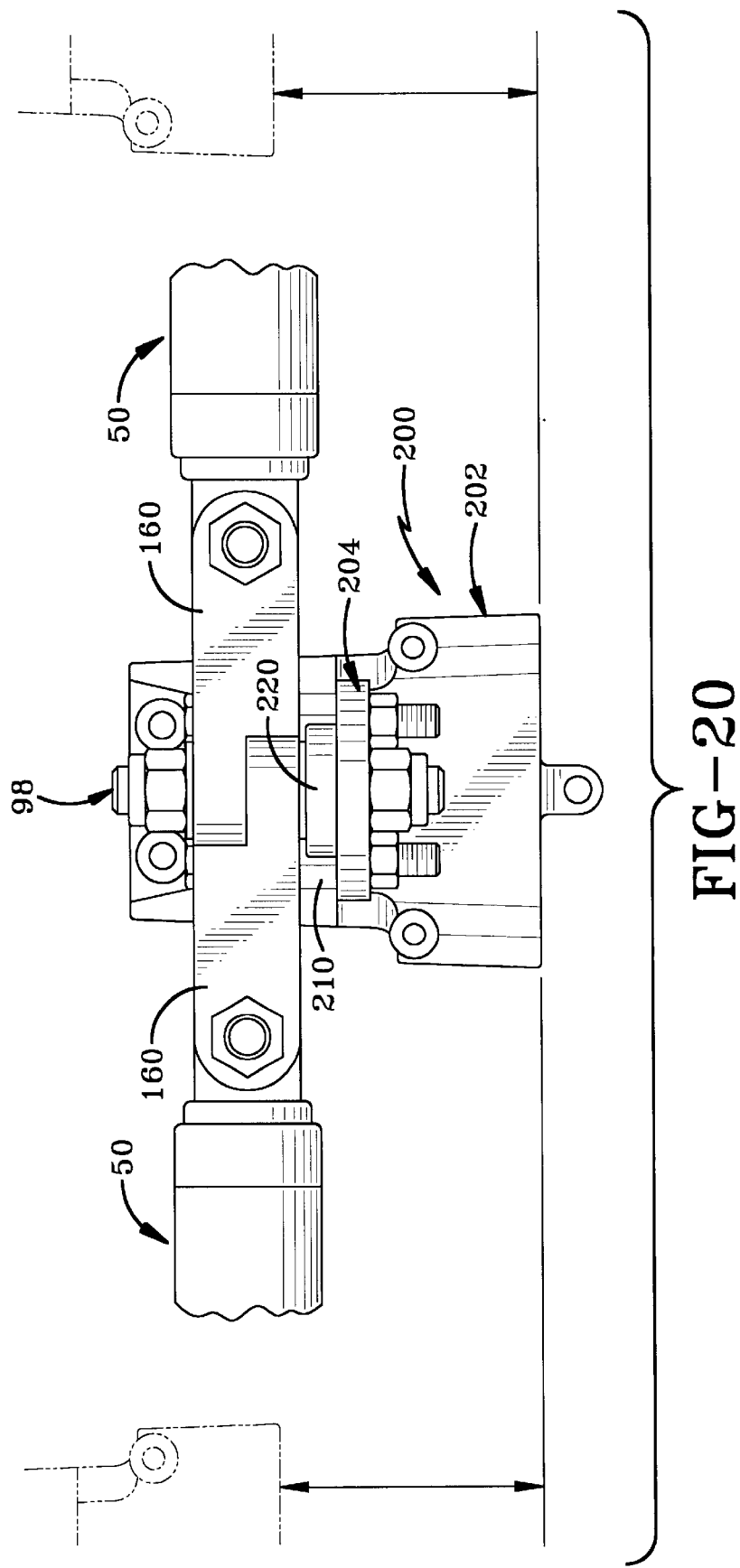
FIG. 20 is a view similar to FIG. 18 showing a third mounting position.
Figure 21:
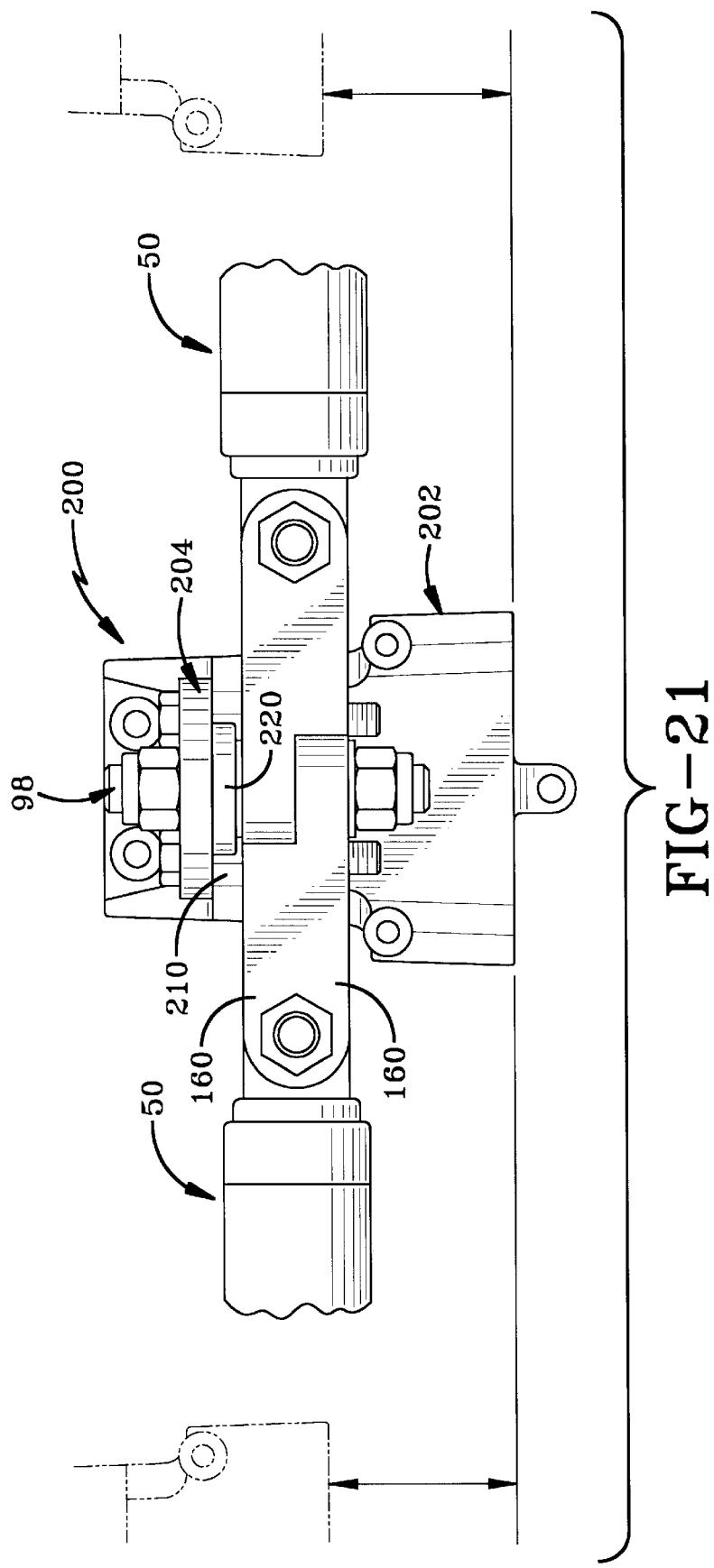
FIG. 21 is a view similar to FIG. 18 showing a fourth mounting configuration.
Figure 22:
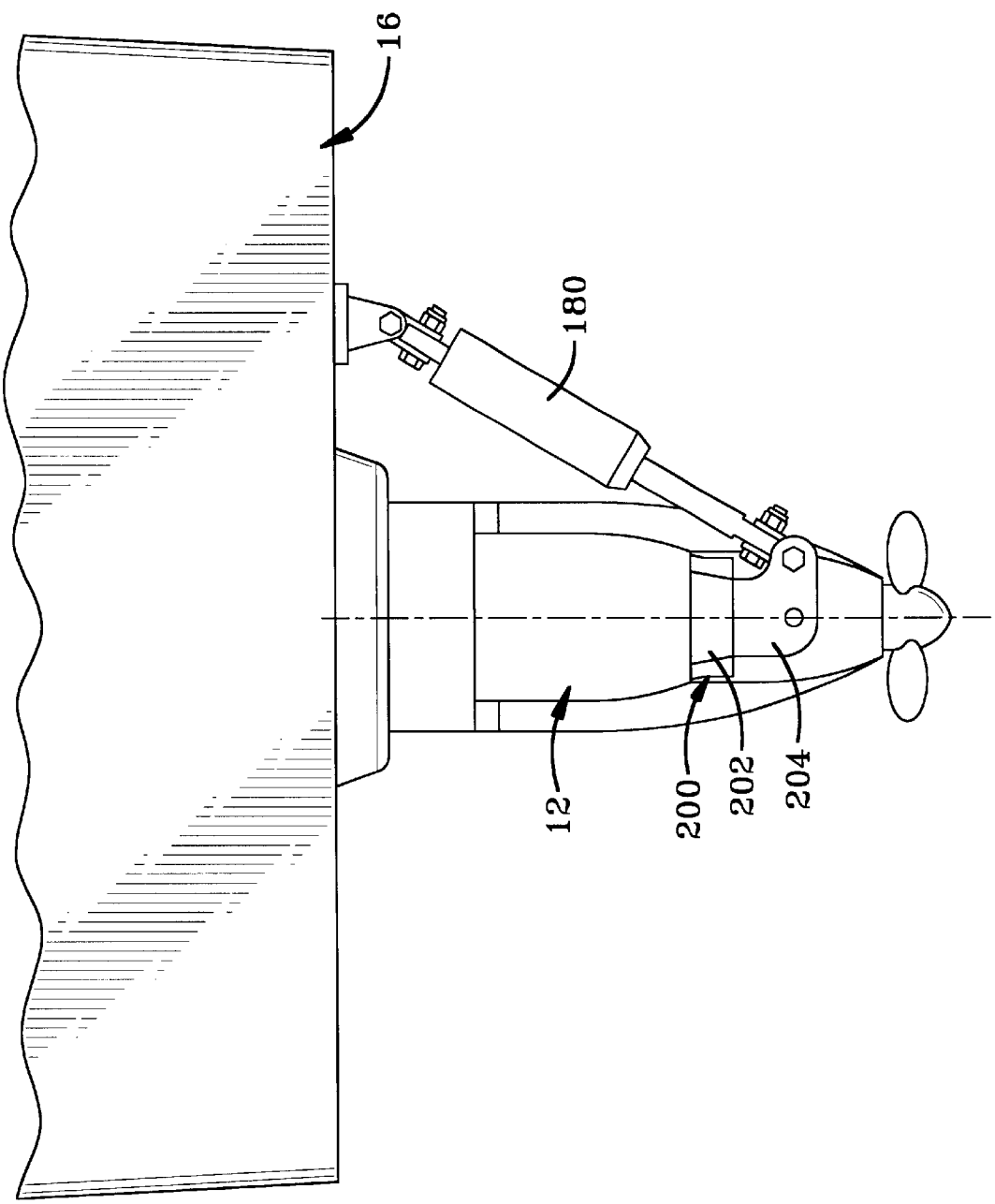
FIG. 22 is a top plan view of a drive using the reconfigurable motor mount of the invention to connect the steering cylinder to the drive.
Figure 23:
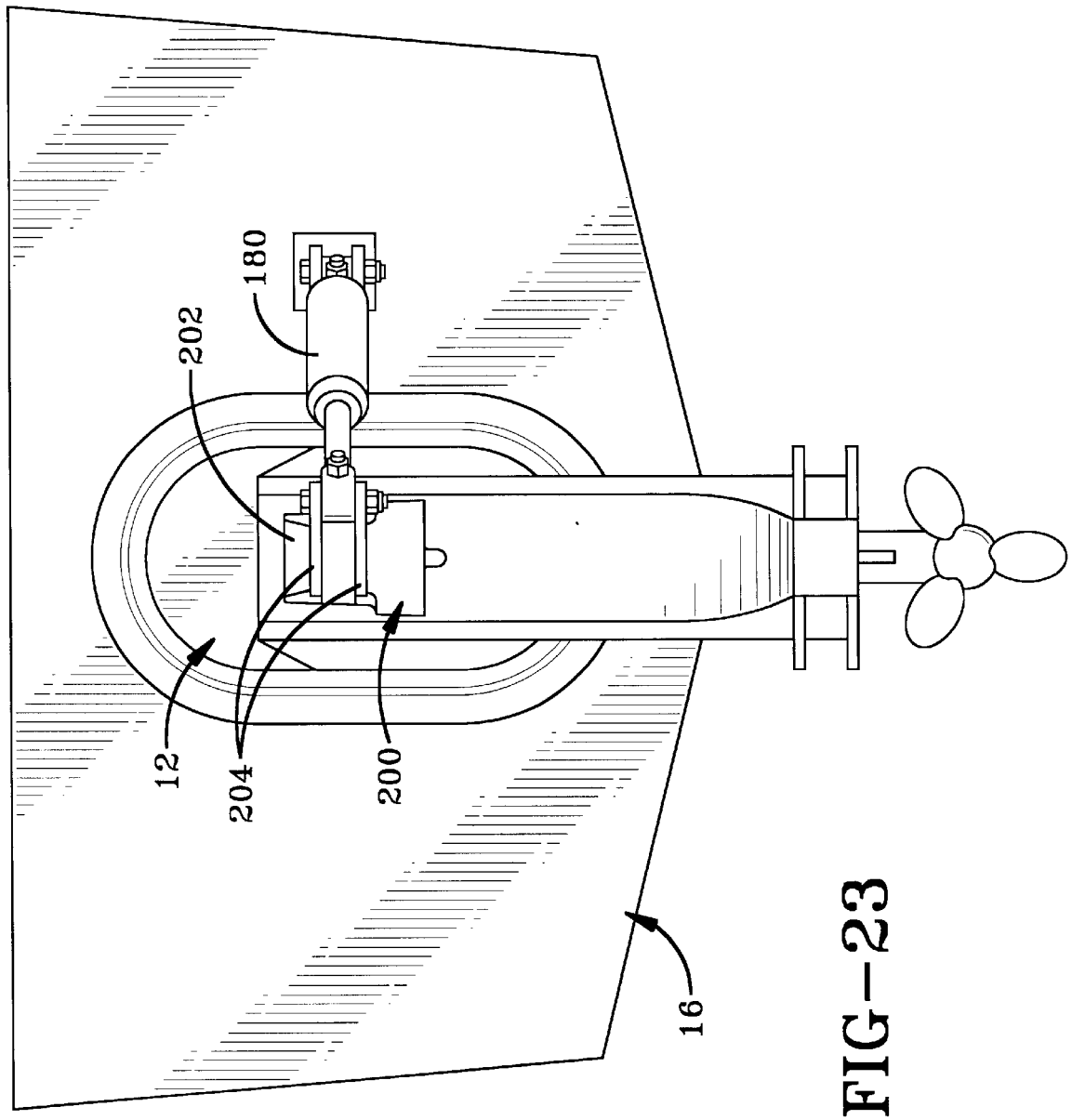
FIG. 23 is an end view of FIG. 22.
Figure 24:
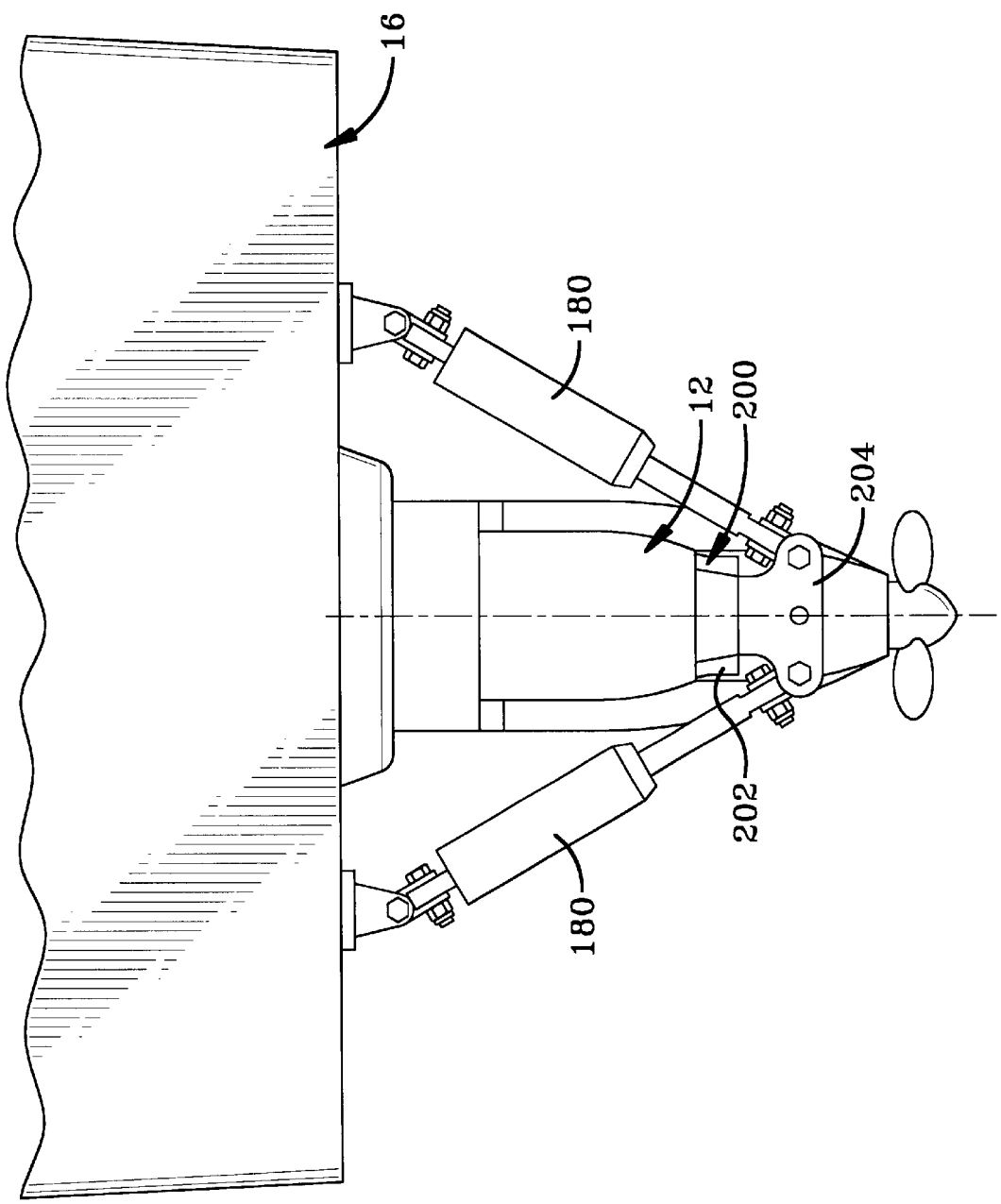
FIG. 24 is a top plan view of a drive using the reconfigurable motor mount of the invention to connect a pair of steering cylinders to the drive.
Figure 25:
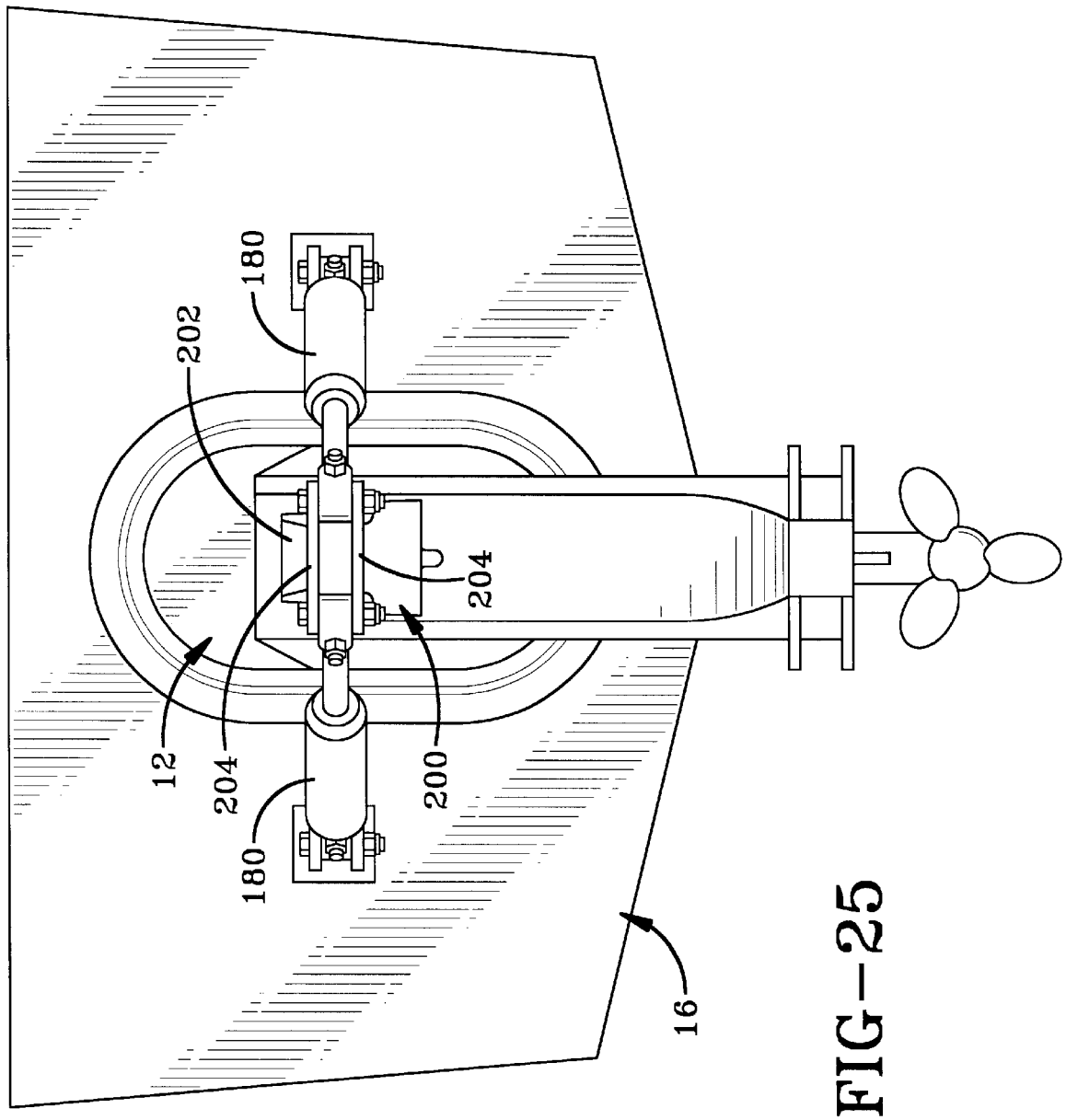
FIG. 25 is an end view of FIG. 24.

Reconfigurable motor mount 200 tie bars 50 to be connected to drive 12 in a variety of different mounting configurations. A few examples are depicted in FIGS. 18–21. The inventor contemplates numerous configurations that are not specifically shown in the drawings. Different configurations may be obtained by varying the arrangements and dimensions of connectors 98, spacers 184, linkages 64, 160, flanges 204, and base 202. These different configurations allow drives 12 having different vertical offsets to be interconnected with tie bars 50. FIGS. 18–21 show exemplary vertical offset arrangements in different mounting configurations. In FIG. 18, a single flange 204 is used above protuberance 210 with linkages 160 disposed immediately on top of a flange 220. In FIG. 19, a different connector 98 is used with flange 204 mounted below protuberance 210. In FIG. 20, flange 204 is mounted below protuberance 210 and connector 98 having flange 220 is used. FIG. 21 shows yet another configuration wherein flange 204 is mounted above protuberance 210 with connector 98 being disposed with flange 220 immediately against flange 204.

FIGS. 22–25 show the use of motor mount 200 to connect steering cylinders 180 to a single drive 12 in single and double configurations.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A tie bar for interconnecting drives on a motorboat; the tie bar having an overall length; the tie bar comprising:
   an outer tube having a first end and a second end;
   a first end assembly connected to the first end of the outer tube; the first end assembly adapted to be connected to one of the drives;
   a second end assembly connected to the second end of the outer tube; the second end assembly including a threaded insert that is threaded into the second end of the outer tube; the threaded insert defining a bore;
   the second end assembly also including a lug having a portion positioned in the bore of the threaded insert; the lug capable of rotating 360 degrees with respect to the threaded insert; and
   the lug having a portion adapted to be connected to the other of the drives.

2. The tie bar of claim 1, wherein the first end assembly threadably engages the outer tube.

3. The tie bar of claim 2, wherein the first end assembly includes a threaded lug that threadably engages the outer tube and a lock nut that threadably engages the threaded lug; the lock nut abutting the outer tube to lock the position of the threaded lug with respect to the outer tube.

4. The tie bar of claim 3, wherein the first end assembly further includes a linkage pivotally connected to the threaded lug with a pivot pin.

5. A tie bar for interconnecting drives on a motorboat; the tie bar having an overall length; the tie bar comprising:
   an outer tube having a first end and a second end;
   a first end assembly connected to the first end of the outer tube;
   a second end assembly connected to the second end of the outer tube; the second end assembly having a portion that rotates 360 degrees with respect to the outer tube without changing the overall length of the tie bar;
   the second end assembly including:
     a threaded insert that is threaded into the second end of the outer tube;
     the threaded insert defining a bore; and
     a lug rotatably positioned in the bore of the threaded insert.

6. The tie bar of claim 5, wherein the threaded insert includes a flange that abuts the second end of the outer tube.

7. The tie bar of claim 6, wherein the outer tube has an outer diameter; the flange having an outer diameter substantially equal to the outer diameter of the outer tube so that the transition between the outer tube and the threaded insert is smooth.

8. The tie bar of claim 5, further comprising a lock nut connected to the lug to hold the lug in the threaded insert.

9. The tie bar of claim 8, wherein the lug has a first end that is stepped down; the lock nut being positioned on the first end of the lug.

10. The tie bar of claim 5, further comprising a sleeve positioned between the lug and the threaded insert.

11. The tie bar of claim 10, wherein the threaded insert defines a seal-receiving recess; a seal being positioned in the recess; the seal engaging the lug.

12. The tie bar of claim 5, wherein the second end assembly further includes a linkage pivotally connected to the threaded lug with a pivot pin.

13. The tie bar of claim 5, wherein the lug includes a flange that engages the threaded insert.

14. A tie bar for interconnecting drives on a motorboat; the tie bar having an overall length; the tie bar comprising:
   an outer tube having a first end and a second end; the outer tube defining a recess at the first end and a recess at the second end;
   a first end assembly connected to the first end of the outer tube;
   the first end assembly including a threaded lug partially disposed in the recess at the first end of the outer tube;
   the lug threadably engaging the outer tube;
   the first end assembly also including a lock nut threadably engaging the threaded lug; the lock nut abutting the first end of the outer tube to lock the position of the threaded lug with respect to the outer tube;
   a second end assembly connected to the second end of the outer tube; the second end assembly having a portion that rotates 360 degrees with respect to the outer tube;
   the second end assembly including a threaded insert that is partially disposed in the recess defined by the second end of the outer tube; the threaded insert defining a bore; and
   the second end assembly also including a lug rotatably positioned in the bore of the threaded insert; the lug adapted to rotate 360 degrees with respect to the outer tube.

15. The tie bar of claim 14, wherein the insert includes a flange that abuts the second end of the outer tube.

16. The tie bar of claim 15, further comprising a lock nut connected to the lug to hold the lug in the insert.

17. The tie bar of claim 16, further comprising a sleeve positioned between the lug and the insert.

18. A drive assembly for a motor boat; the assembly comprising:
   a first drive having a centerline;
   a second drive having a centerline;
   a first motor mount connected to the first drive; the first motor mount having a base with a protuberance integrally extending from the base; the first motor mount also including a flange removably attached to the protuberance with a clamping bolt;
   a second motor mount connected to the second drive; the second motor mount having a base with a protuberance integrally extending from the base; the second motor mount also including a flange removably attached to the protuberance with a clamping bolt;
   a tie bar having a first end and a second end; the first end of the tie bar being connected to the flange of the first motor mount; the connection between the first end of the tie bar and the flange being aligned with the centerline of the first drive; and the second end of the tie bar being connected to the flange of the second motor mount; the connection between the second end of the tie bar and the flange being aligned with the centerline of the second drive.

19. The assembly of claim 18, wherein the tie bar has an overall length; the tie bar including:

an outer tube having a first end and a second end;

a first end assembly connected to the first end of the outer tube; and a second end assembly connected to the second end of the outer tube; the second end assembly having a portion that rotates 360 degrees with respect to the outer tube without changing the overall length of the tie bar.

20. A drive assembly for a motor boat; the assembly comprising:

a first drive having a centerline;

a second drive having a centerline;

a first motor mount connected to the first drive; the first motor mount having a base and a flange removably attached to the base;

a second motor mount connected to the second drive; the second motor mount having a base and a flange removably attached to the base;

a tie bar having a first end and a second end and an overall length; the first end of the tie bar being connected to the flange of the first motor mount; the connection between the first end of the tie bar and the flange being aligned with the centerline of the first drive;

the second end of the tie bar being connected to the flange of the second motor mount; the connection between the second end of the tie bar and the flange being aligned with the centerline of the second drive;

the tie bar including an outer tube having a first end and a second end; a first end assembly connected to the first end of the outer tube; and a second end assembly connected to the second end of the outer tube; the second end assembly having a portion that rotates 360 degrees with respect to the outer tube without changing the overall length of the tie bar; and each motor mount including a pair of opposed flanges and a protuberance extending from the base of the motor mount; the protuberance having opposed surfaces; the flanges being clamped onto the opposed surfaces of the protuberance.

21. A drive assembly for a motor boat; the assembly comprising:

a first drive having a centerline; and a first motor mount connected to the first drive; the first motor mount having a base and a flange removably attached to the base; the flange being adapted to be connected with at least one of a tie bar and a steering cylinder; the motor mount including a pair of opposed flanges and a protuberance extending from the base of the motor mount; the protuberance having opposed surfaces; the flanges being clamped onto the opposed surfaces of the protuberance such that a portion of the protuberance is disposed between the flanges; each flange defining an opening adapted to receive a connector; the openings of the flanges being aligned when the flanges are connected to the base.

22. The assembly of claim 21, further comprising a connector disposed in the openings of the flanges; the connector including first and second shoulders; each shoulder disposed to abut a flange when the connector is disposed in the openings of the flanges.

23. A drive assembly for a motor boat; the assembly comprising:

a first drive having a centerline;

a first motor mount connected to the first drive; the first motor mount having a base and a flange removably attached to the base; the flange being adapted to be connected with at least one of a tie bar and a steering cylinder;

the motor mount including a pair of opposed flanges and a protuberance extending from the base of the motor mount: the protuberance having opposed surfaces; the flanges being clamped onto the opposed surfaces of the protuberance; each flange defining an opening adapted to receive a connector; the openings of the flanges being aligned when the flanges are connected to the base;

a connector disposed in the openings of the flanges; the connector including first and second shoulders; each shoulder disposed to abut a flange when the connector is disposed in the openings of the flanges; and a spacer disposed on the connector; the spacer being disposed between the flanges of the motor mount.

24. The assembly of claim 23, further comprising a spacer that defines one of the first and second shoulders.

25. The assembly of claim 21, wherein each of the flanges is provided in one of a right hand, left hand, center, or double configurations.

26. The tie bar of claim 1, wherein the threaded insert includes a flange that abuts the second end of the outer tube.

27. The tie bar of claim 1, wherein the lug of the second end assembly includes a threaded portion; the second end assembly including a lock nut disposed on the threaded portion of the lug to hold the lug in the threaded insert.

28. The tie bar of claim 1, further comprising a sleeve positioned between the lug and the threaded insert.

29. The tie bar of claim 1, wherein the threaded insert defines a seal-receiving recess; a seal being positioned in the recess; the seal engaging the lug.

* * * * *